(12) United States Patent
Lee et al.

(10) Patent No.: US 10,261,615 B2
(45) Date of Patent: Apr. 16, 2019

(54) METHOD AND ELECTRONIC DEVICE FOR OUTPUTTING SCREEN

(71) Applicant: SAMSUNG ELECTRONICS CO., LTD., Suwon-si, Gyeonggi-do (KR)

(72) Inventors: Ho Young Lee, Seoul (KR); Gyu Chual Kim, Bucheon-si (KR); Bo Keun Kim, Suwon-si (KR); Ji Won Kim, Seoul (KR); Kyu Ok Choi, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/584,305

(22) Filed: May 2, 2017

(65) Prior Publication Data

US 2017/0322658 A1    Nov. 9, 2017

(30) Foreign Application Priority Data

May 3, 2016   (KR) .......................... 10-2016-0054548

(51) Int. Cl.
*G06F 3/041*    (2006.01)
*G06F 3/0488*   (2013.01)

(52) U.S. Cl.
CPC ............ *G06F 3/0414* (2013.01); *G06F 3/041* (2013.01); *G06F 3/0412* (2013.01); *G06F 3/0416* (2013.01); *G06F 3/0488* (2013.01); *G06F 2203/04105* (2013.01)

(58) Field of Classification Search
CPC ........ G06F 3/041; G06F 3/044; G06F 3/0488; G06F 3/0414; G06F 3/0412; G06F 3/0416; G06F 2203/04105
See application file for complete search history.

(56) References Cited

U.S. PATENT DOCUMENTS

| 8,626,095 | B1 | 1/2014 | Kim |
| 8,824,985 | B2 | 9/2014 | Kim |
| 8,928,594 | B2 | 1/2015 | Chang et al. |
| 9,106,765 | B2 | 8/2015 | Kim |
| 9,170,698 | B2 | 10/2015 | Chang et al. |
| 9,509,834 | B2 | 11/2016 | Kim |
| 9,559,740 | B2 | 1/2017 | Lee et al. |
| 2009/0066663 | A1 | 3/2009 | Chang et al. |
| 2009/0160793 | A1* | 6/2009 | Rekimoto ............. G06F 3/0414 345/173 |

(Continued)

FOREIGN PATENT DOCUMENTS

| KR | 10-2009-0026977 | 3/2009 |
| KR | 10-2014-0089224 | 7/2014 |

*Primary Examiner* — Md Saiful A Siddiqui
(74) *Attorney, Agent, or Firm* — Nixon & Vanderhye P.C.

(57) ABSTRACT

An electronic device includes a touch sensitive display, and a processor electrically connected with the touch sensitive display. The processor is configured to sense a first touch and a second touch on the touch sensitive display, to display a first region expanding with respect to a location at which the first touch is made, on the touch sensitive display, to display a second region expanding with respect to a location at which the second touch is made, on the touch sensitive display, and to display a specified screen in the touch sensitive display if a sum of an area of the first region and an area of the second region exceeds a specified value.

20 Claims, 17 Drawing Sheets

(56) References Cited

U.S. PATENT DOCUMENTS

| | | | |
|---|---|---|---|
| 2010/0013777 A1* | 1/2010 | Baudisch | G06F 1/1626 345/173 |
| 2013/0069889 A1* | 3/2013 | Pearce | G06F 3/0416 345/173 |
| 2013/0147706 A1* | 6/2013 | Kim | G06F 1/1626 345/156 |
| 2013/0271413 A1* | 10/2013 | Shibuya | G06F 3/044 345/173 |
| 2014/0206316 A1 | 7/2014 | Kim | |
| 2014/0317722 A1* | 10/2014 | Tartz | G06F 3/011 726/19 |
| 2015/0004941 A1 | 1/2015 | Kim | |
| 2015/0084925 A1 | 3/2015 | Chang et al. | |
| 2015/0311940 A1 | 10/2015 | Lee et al. | |
| 2015/0312405 A1 | 10/2015 | Kim | |
| 2016/0048262 A1 | 2/2016 | Chang et al. | |

\* cited by examiner

METHOD AND ELECTRONIC DEVICE FOR OUTPUTTING SCREEN

CROSS-REFERENCE TO RELATED APPLICATION

This application is based on and claims priority under 35 U.S.C. § 119 to a Korean patent application filed on May 3, 2016 in the Korean Intellectual Property Office and assigned Serial number 10-2016-0054548, the disclosure of which is incorporated by reference herein in its entirety.

TECHNICAL FIELD

This disclosure relates generally to a screen outputting method and an electronic device performing the same.

BACKGROUND

With the development of mobile communication technologies, an electronic device, which is equipped with a display, such as a smartphone, a wearable device, or the like has been widely supplied since the spread of personal computers.

A display of the electronic device may be implemented with a so-called touchscreen display by additionally including a touch panel. The display implemented with the touch screen may perform a role as an input device that receives a user manipulation, in addition to a role as a visual display device.

SUMMARY

Example aspects of this disclosure address at least the above-mentioned problems and/or disadvantages and provide at least the advantages described below. Accordingly, an example aspect of this disclosure is to provide a method capable of providing a graphic effect corresponding to a contact of a user's finger on a touch sensitive display (or touchscreen display) and outputting a screen specified in advance on the touch sensitive display and an electronic device performing the same.

In accordance with an example aspect of this disclosure, an electronic device may include a touch sensitive display, and a processor electrically connected with the touch sensitive display. The processor may be configured to sense a first touch and a second touch on the touch sensitive display, may display a first region expanding with respect to a location at which the first touch is made, on the touch sensitive display, may display a second region expanding with respect to a location at which the second touch is made, on the touch sensitive display, and may display a specified screen on the touch sensitive display if a sum of an area of the first region and an area of the second region exceeds a specified value.

In accordance with another example aspect of this disclosure, a screen outputting method of an electronic device may include sensing a first touch and a second touch on a touch sensitive display, displaying a first region expanding with respect to a location at which the first touch is made, on the touch sensitive display, displaying a second region expanding with respect to a location at which the second touch is made, on the touch sensitive display, and displaying a specified screen on the touch sensitive display if a sum of an area of the first region and an area of the second region exceeds a specified value.

In accordance with another example aspect of this disclosure, a storage medium may store instructions that, when executed by a processor, cause an electronic device to perform operations including sensing a first touch and a second touch on a touch sensitive display, displaying a first region expanding with respect to a location at which the first touch is made on the touch sensitive display, displaying a second region expanding with respect to a location at which the second touch is made on the touch sensitive display, and displaying a specified screen on the touch sensitive display if a sum of an area of the first region and an area of the second region exceeds a specified value.

Other aspects, advantages, and salient features of the disclosure will become apparent to those skilled in the art from the following detailed description, which, taken in conjunction with the annexed drawings, discloses various embodiments of this disclosure.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

Throughout the drawings, it should be noted that like reference numbers are used to depict the same or similar elements, features, and structures.

DETAILED DESCRIPTION

Figure 1:
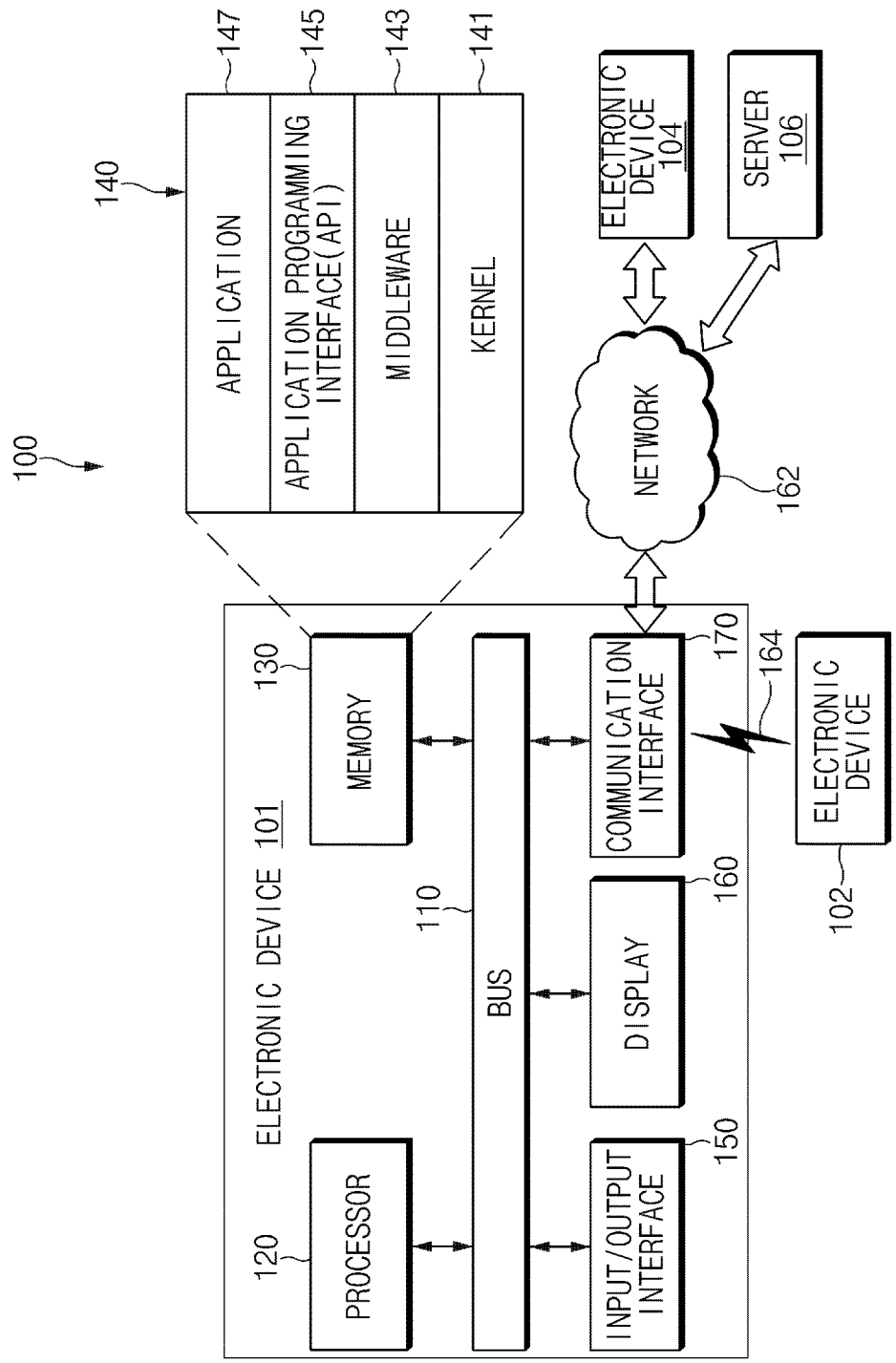
FIG. 1 is a diagram illustrating an example electronic device in a network environment, according to various example embodiments.

Hereinafter, various example embodiments of this disclosure will be described with reference to accompanying drawings. Accordingly, those skilled in the art will recognize that modification, equivalent, and/or alternative on the various embodiments described herein can be variously made without departing from the scope and spirit of this disclosure. With regard to description of drawings, similar elements may be marked by similar reference numerals.

In this disclosure, the expressions "have", "may have", "include" and "comprise", or "may include" and "may comprise" indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or the priority. For example, without departing the scope of this disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. On the other hand, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not refer only to "specifically designed to" in hardware. Instead, the expression "a device configured to" may refer to a situation in which the device is "capable of" operating together with another device or other components. For example, a "processor configured to (or set to) perform A, B, and C" may refer, for example, to a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe various example embodiments and are not intended to limit the scope of another embodiment. The terms of a singular form may include plural forms unless otherwise specified. All the terms used herein, which include technical or scientific terms, may have the same meaning that is generally understood by those skilled in the art. It will be further understood that terms, which are defined in a dictionary and commonly used, should also be interpreted as being customary in the relevant art and not in an idealized or overly formal unless expressly so defined in various embodiments of this disclosure. In some cases, even if certain terms are defined in this disclosure, they may not be interpreted to exclude embodiments of this disclosure.

An electronic device according to various embodiments of this disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices, or the like, but is not limited thereto. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit), or the like, but is not limited thereto.

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, and Google TV™), game consoles (e.g., Xbox™ and PlayStation™), electronic dictionaries, electronic keys, camcorders, electronic picture frames, or the like, but is not limited thereto.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like), or the like, but is not limited thereto.

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like), or the like, but is not limited thereto. According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 is a block diagram illustrating an example electronic device in a network environment 100, according to various example embodiments.

Referring to FIG. 1, according to various embodiments, an electronic device 101, 102, or 104 or a server 106 may be connected with each other over a network 162 or a short range communication 164. The electronic device 101 may include a bus 110, a processor (e.g., including processing circuitry) 120, a memory 130, an input/output interface (e.g., including interface circuitry) 150, a display 160, and a communication interface (e.g., including communication circuitry) 170. According to an embodiment, the electronic device 101 may not include at least one of the above-described elements or may further include other element(s).

For example, the bus 110 may interconnect the above-described elements 110 to 170 and may include a circuit for conveying communications (e.g., a control message and/or data) among the above-described elements.

The processor 120 may include various processing circuitry, such as, for example, and without limitation, one or more of a dedicated processor, a central processing unit (CPU), an application processor (AP), or a communication processor (CP). For example, the processor 120 may perform an arithmetic operation or data processing associated with control and/or communication of at least one other element(s) of the electronic device 101.

The memory 130 may include a volatile and/or nonvolatile memory. For example, the memory 130 may store instructions or data associated with at least one other element(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)".

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform, for example, a mediation role such that the API 145 or the application program 147 communicates with the kernel 141 to exchange data.

Furthermore, the middleware 143 may process one or more task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be, for example, an interface through which the application program 147 controls a function provided by the kernel 141 or the middleware 143, and may include, for example, at least one interface or function (e.g., an instruction) for a file control, a window control, image processing, a character control, or the like.

The input/output interface 150 may include various input/output circuitry and play a role, for example, of an interface which transmits an instruction or data input from a user or another external device, to other element(s) of the electronic device 101. Furthermore, the input/output interface 150 may output an instruction or data, received from other element(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display, or the like, but is not limited thereto. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body.

For example, the communication interface 170 may include various communication circuitry and establish communication between the electronic device 101 and an external device (e.g., the first external electronic device 102, the second external electronic device 104, or the server 106). For example, the communication interface 170 may be connected to the network 162 over wireless communication or wired communication to communicate with the external device (e.g., the second external electronic device 104 or the server 106). Additionally, the communication interface 170 may be connected to another electronic device 102 over a short-range wireless communication connection 164.

The wireless communication may include cellular communication employing at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. According to an embodiment, the wireless communication may include, for example, at least one of wireless fidelity (Wi-Fi), Bluetooth, near field communication (NFC), magnetic stripe transmission (MST), radio frequency (RF), a body area network (BAN), and a global navigation satellite system (GNSS).

The MST may generate a pulse in response to transmission data using an electromagnetic signal, and the pulse may generate a magnetic field signal. The electronic device 101 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (Beidou), or a European global satellite-based navigation system (Galileo) based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., LAN or WAN), an Internet, or a telephone network.

Each of the first and second external electronic devices 102 and 104 may be a device of which the type is different from or the same as that of the electronic device 101. According to an embodiment, the server 106 may include a group of one or more servers. According to various embodiments, all or a portion of operations performed in the electronic device 101 may be executed by another or plural electronic devices (e.g., the electronic devices 102 and 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 at other device (e.g., the electronic device 102 or 104 or the server 106). The other electronic device (e.g., the electronic device 102 or 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
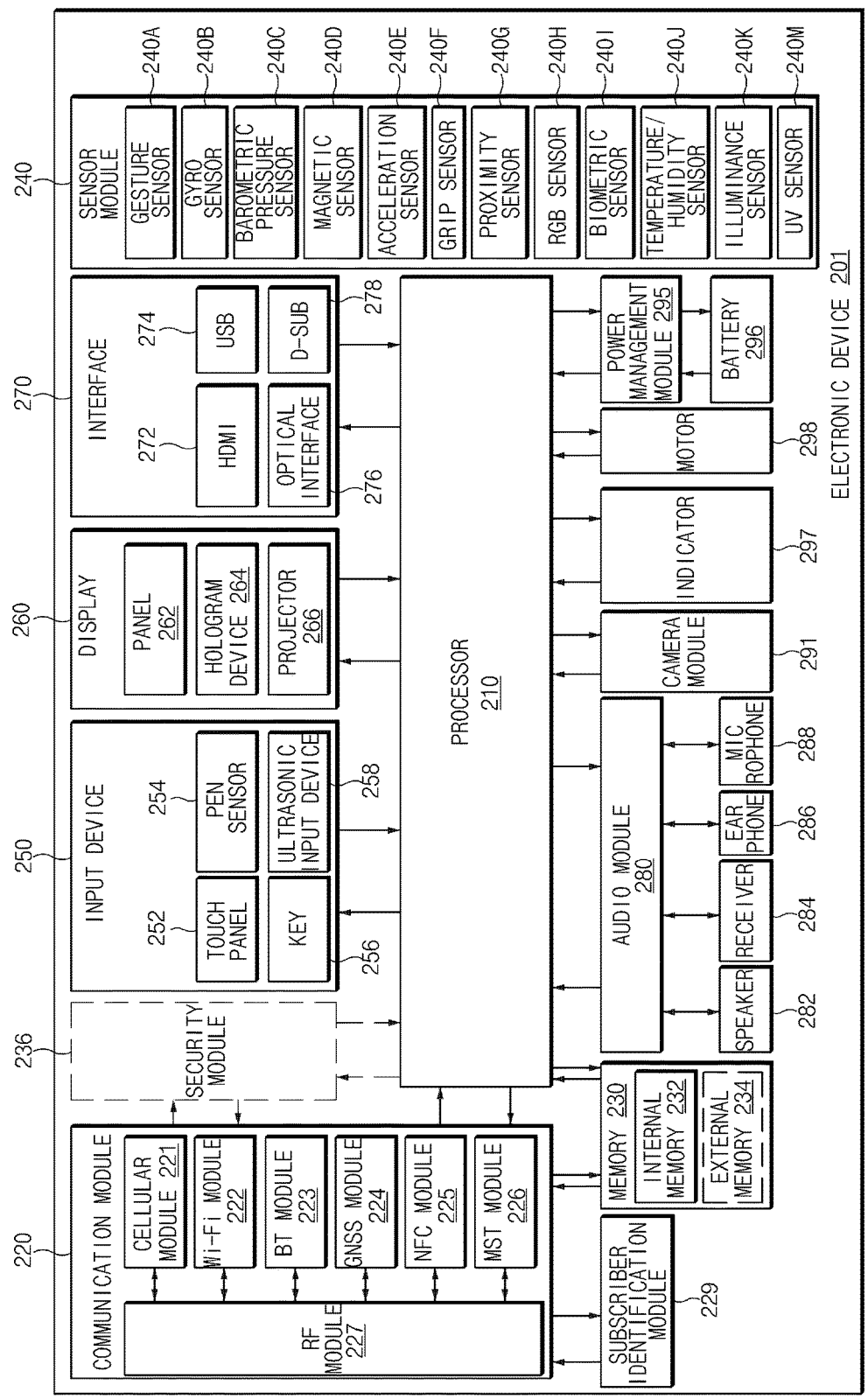
FIG. 2 is a block diagram illustrating an example electronic device, according to various example embodiments.

FIG. 2 is a block diagram illustrating an example electronic device, according to various example embodiments.

Referring to FIG. 2, an electronic device 201 may include, for example, an entire part or a part of the electronic device 101 illustrated in FIG. 1. The electronic device 201 may include one or more processors (e.g., an application processor AP) (e.g., including processing circuitry) 210, a communication module (e.g., including communication circuitry) 220, a subscriber identification module 229, a memory 230, a security module (e.g., including a memory) 236 a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and operate, for example, an operating system (OS) or an application to control a plurality of hardware or software elements connected to the processor 210 and may process and compute a variety of data. For example, the processor 210 may be implemented with a System on Chip (SoC). According to an embodiment, the processor 210 may further include a graphic processing unit (GPU) and/or an image signal processor. The processor 210 may include at least a part (e.g., a cellular module 221) of elements illustrated in FIG. 2. The processor 210 may load an instruction or data, which is received from at least one of other elements (e.g., a nonvolatile memory), into a volatile memory and process the loaded instruction or data. The processor 210 may store a variety of data in the nonvolatile memory.

The communication module 220 may be configured the same as or similar to the communication interface 170 of FIG. 1. The communication module 220 may include various communication circuitry, such as, for example, and without limitation, the cellular module 221, a Wi-Fi module 222, a Bluetooth (BT) module 223, a GNSS module 224 (e.g., a GPS module, a Glonass module, a Beidou module, or a Galileo module), a near field communication (NFC) module 225, a MST module 226, and a radio frequency (RF) module 227.

The cellular module 221 may provide, for example, voice communication, video communication, a character service, an Internet service, or the like over a communication network. According to an embodiment, the cellular module 221 may perform discrimination and authentication of the electronic device 201 within a communication network by using the subscriber identification module (e.g., a SIM card) 229. According to an embodiment, the cellular module 221 may perform at least a portion of functions that the processor 210 provides. According to an embodiment, the cellular module 221 may include a communication processor (CP).

Each of the Wi-Fi module 222, the BT module 223, the GNSS module 224, the NFC module 225, or the MST module 226 may include a processor for processing data exchanged through a corresponding module, for example. According to an embodiment, at least a part (e.g., two or more) of the cellular module 221, the Wi-Fi module 222, the BT module 223, the GNSS module 224, the NFC module 225, or the MST module 226 may be included within one Integrated Circuit (IC) or an IC package.

For example, the RF module 227 may transmit and receive a communication signal (e.g., an RF signal). For example, the RF module 227 may include a transceiver, a power amplifier module (PAM), a frequency filter, a low noise amplifier (LNA), an antenna, or the like. According to another embodiment, at least one of the cellular module 221, the Wi-Fi module 222, the BT module 223, the GNSS module 224, the NFC module 225, or the MST module 226 may transmit and receive an RF signal through a separate RF module.

The subscriber identification module 229 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 230 (e.g., the memory 130) may include an internal memory 232 and/or an external memory 234. For example, the internal memory 232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic device 201 through various interfaces.

A security module 236 may include various circuitry and a memory and be a module that includes a storage space of which a security level is higher than that of the memory 230 and may be a circuit that guarantees safe data storage and a protected execution environment. The security module 236 may be implemented with a separate circuit and may include a separate processor. For example, the security module 236 may be in a smart chip or a secure digital (SD) card, which is removable, or may include an embedded secure element (eSE) embedded in a fixed chip of the electronic device 201. Furthermore, the security module 236 may operate based on an operating system (OS) that is different from the OS of the electronic device 201. For example, the security module 236 may operate based on java card open platform (JCOP) OS.

The sensor module 240 may measure, for example, a physical quantity or may detect an operation state of the electronic device 201. The sensor module 240 may convert the measured or detected information to an electrical signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, or an UV sensor 240M. Although not illustrated, additionally or generally, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic device 201 may further include a processor that is a part of the processor 210 or independent of the processor 210 and is configured to control the sensor module 240. The processor may control the sensor module 240 while the processor 210 remains at a sleep state.

The input device 250 may include various input circuitry, such as, for example, and without limitation, a touch panel 252, a (digital) pen sensor 254, a key 256, or an ultrasonic input unit 258. For example, the touch panel 252 may use at least one of capacitive, resistive, infrared and ultrasonic detecting methods. Also, the touch panel 252 may further include a control circuit. The touch panel 252 may further include a tactile layer to provide a tactile reaction to a user.

The (digital) pen sensor 254 may be, for example, a part of a touch panel or may include an additional sheet for recognition. The key 256 may include, for example, a physical button, an optical key, or a keypad. The ultrasonic input device 258 may detect (or sense) an ultrasonic signal, which is generated from an input device, through a microphone (e.g., a microphone 288) and may check data corresponding to the detected ultrasonic signal.

The display 260 (e.g., the display 160) may include a panel 262, a hologram device 264, or a projector 266. The panel 262 may be the same as or similar to the display 160 illustrated in FIG. 1. The panel 262 may be implemented, for example, to be flexible, transparent or wearable. The panel 262 and the touch panel 252 may be integrated into a single module. The hologram device 264 may display a stereoscopic image in a space using a light interference phenomenon. The projector 266 may project light onto a screen so as to display an image. For example, the screen may be arranged in the inside or the outside of the electronic device 201. According to an embodiment, the panel 262 may include a pressure sensor (or force sensor) that measures the intensity of touch pressure by a user. The pressure sensor may be implemented integrally with the touch panel 252, or may be implemented as at least one sensor separately from the touch panel 252. According to an embodiment, the display 260 may further include a control circuit for controlling the panel 262, the hologram device 264, or the projector 266.

The interface 270 may include various interface circuitry, such as, for example, and without limitation, a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or generally, the interface 270 may include, for example, a mobile high definition link (MHL) interface, a SD card/multi-media card (MMC) interface, or an infrared data association (IrDA) standard interface.

The audio module 280 may convert a sound and an electric signal in dual directions. At least a part of the audio module 280 may be included, for example, in the input/output interface 150 illustrated in FIG. 1. The audio module 280 may process, for example, sound information that is input or output through a speaker 282, a receiver 284, an earphone 286, or the microphone 288.

For example, the camera module 291 may shoot a still image or a video. According to an embodiment, the camera module 291 may include at least one or more image sensors (e.g., a front sensor or a rear sensor), a lens, an image signal processor (ISP), or a flash (e.g., an LED or a xenon lamp).

The power management module 295 may manage, for example, power of the electronic device 201. According to an embodiment, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specified state of the electronic device 201 or a part thereof (e.g., the processor 210), such as a booting state, a message state, a charging state, and the like. The motor 298 may convert an electrical signal into a mechanical vibration and may generate the following effects: vibration, haptic, and the like. Although not illustrated, a processing device (e.g., a GPU) for supporting a mobile TV may be included in the electronic device 201. The processing device for supporting the mobile TV may process media data according to the standards of digital multimedia broadcasting (DMB), digital video broadcasting (DVB), MediaFlo™, or the like.

Each of the above-mentioned elements of the electronic device according to various embodiments described in this disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 3:
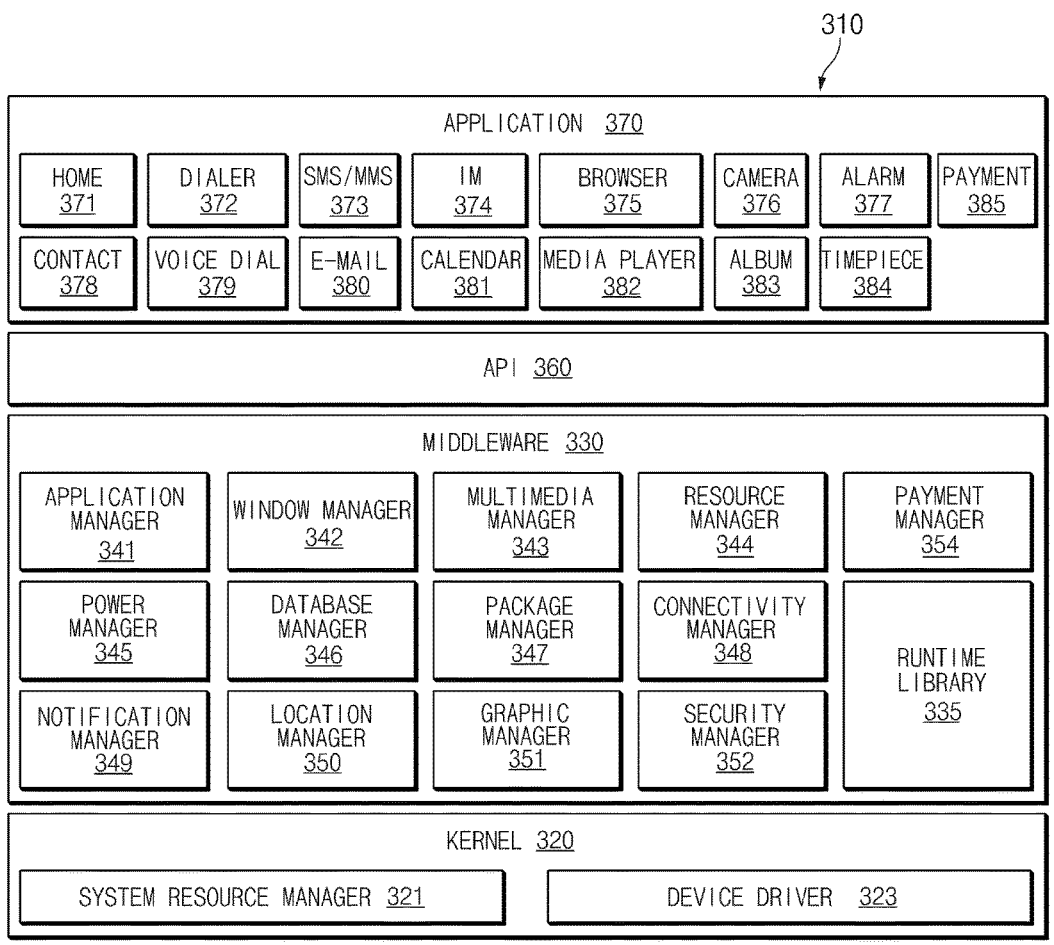
FIG. 3 is a block diagram illustrating an example program module, according to various example embodiments.

FIG. 3 is a block diagram illustrating an example program module, according to various example embodiments.

Referring to FIG. 3, a program module 310 (e.g., the program 140) may include an operating system (OS) to control resources associated with an electronic device (e.g., the electronic device 101), and/or diverse applications (e.g., the application program 147) driven on the OS. The OS may be, for example, Android, iOS, Windows, Symbian, Tizen, or Samsung Bada OS.

The program module 310 may include a kernel 320, a middleware 330, an application programming interface (API) 360, and/or an application 370. At least a portion of the program module 310 may be preloaded on an electronic device or may be downloadable from an external electronic device (e.g., the electronic device 102 or 104, the server 106, or the like).

The kernel 320 (e.g., the kernel 141) may include, for example, a system resource manager 321 or a device driver 323. The system resource manager 321 may control, allocate, or retrieve system resources. According to an embodiment, the system resource manager 321 may include a process managing unit, a memory managing unit, a file system managing unit, or the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide, for example, a function that the application 370 needs in common, or may provide diverse functions to the application 370 through the API 360 to allow the application 370 to efficiently use limited system resources of the electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, or a payment manager 354.

The runtime library 335 may include, for example, a library module that is used by a compiler to add a new function through a programming language while the application 370 is being executed. The runtime library 335 may perform input/output management, memory management, or capacities about arithmetic functions.

The application manager 341 may manage, for example, a life cycle of at least one application of the application 370. The window manager 342 may manage a graphic user interface (GUI) resource that is used in a screen. The multimedia manager 343 may identify a format necessary for playing diverse media files, and may perform encoding or decoding of media files by using a codec suitable for the format. The resource manager 344 may manage resources such as a storage space, memory, or source code of at least one application of the application 370.

The power manager 345 may operate, for example, with a basic input/output system (BIOS) to manage a battery or power, and may provide power information for an operation of an electronic device. The database manager 346 may generate, search for, or modify database that is to be used in at least one application of the application 370. The package manager 347 may install or update an application that is distributed in the form of package file.

The connectivity manager 348 may manage, for example, wireless connection such as Wi-Fi or Bluetooth. The notification manager 349 may display or notify an event such as arrival message, appointment, or proximity notification in a mode that does not disturb a user. The location manager 350 may manage location information about an electronic device. The graphic manager 351 may manage a graphic effect that is provided to a user, or manage a user interface relevant thereto. The security manager 352 may provide a general security function necessary for system security, user authentication, or the like. According to an embodiment, in the case where an electronic device (e.g., the electronic device 101) includes a telephony function, the middleware 330 may further include a telephony manager for managing a voice or video call function of the electronic device.

The middleware 330 may include a middleware module that combines diverse functions of the above-described elements. The middleware 330 may provide a module specialized to each OS kind to provide differentiated functions. Additionally, the middleware 330 may dynamically remove a part of the preexisting elements or may add new elements thereto.

The API 360 (e.g., the API 145) may be, for example, a set of programming functions and may be provided with a configuration that is variable depending on an OS. For example, in the case where an OS is the android or the iOS, it may provide one API set per platform. In the case where an OS is the tizen, it may provide two or more API sets per platform.

The application 370 (e.g., the application program 147) may include, for example, one or more applications capable of providing functions for a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, a timepiece 384, a payment 385, and other applications, such as, for example, and without limitation, health care (e.g., measuring an exercise quantity, blood sugar, or the like) (not shown), offering of environment information (e.g., information of barometric pressure, humidity, temperature, or the like) (not shown), and the like.

According to an embodiment, the application 370 may include an application (hereinafter referred to as "information exchanging application" for descriptive convenience) to support information exchange between an electronic device (e.g., the electronic device 101) and an external electronic device (e.g., the electronic device 102 or 104). The information exchanging application may include, for example, a notification relay application for transmitting specified information to the external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the electronic device 102 or 104). Additionally, the information exchanging application may receive, for example, notification information from the external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device (e.g., the electronic device 102 or 104) which communicates with the electronic device, an application running in the external electronic device, or a service (e.g., a call service, a message service, or the like) provided from the external electronic device.

According to an embodiment, the application 370 may include an application (e.g., a health care application of a mobile medical device) that is assigned in accordance with an attribute of an external electronic device (e.g., the electronic device 102 or 104). According to an embodiment, the application 370 may include an application that is received from the external electronic device (e.g., the server 106 or the electronic device 102 or 104). According to an embodiment, the application 370 may include a preloaded application or a third party application that is downloadable from a server. The names of elements of the program module 310 according to the embodiment may be modifiable depending on kinds of operating systems.

According to various embodiments, at least a portion of the program module 310 may be implemented by software, firmware, hardware, or a combination of two or more thereof. At least a portion of the program module 310 may be implemented (e.g., executed), for example, by the processor (e.g., the processor 210). At least a portion of the program module 310 may include, for example, modules, programs, routines, sets of instructions, processes, or the like for performing one or more functions.

Figure 4A:
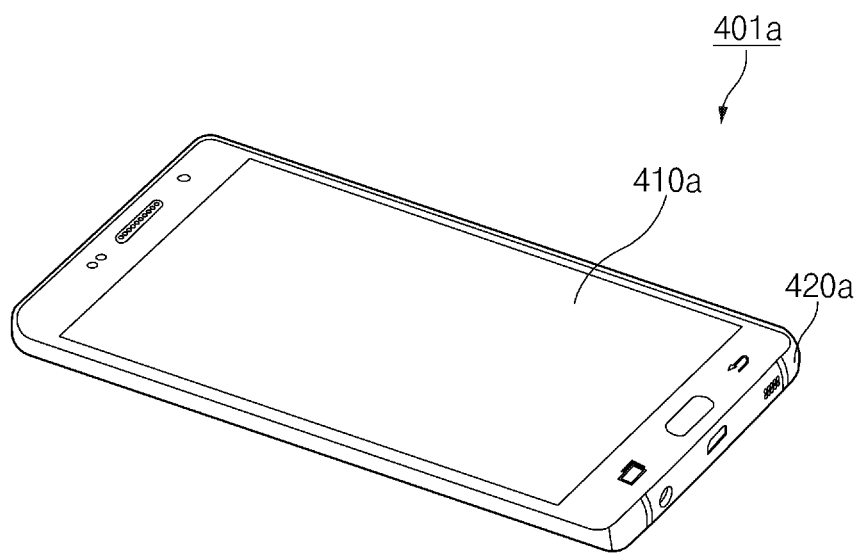
FIGS. 4A and 4B are diagrams illustrating example appearances of the electronic device, according to various example embodiments.

FIG. 4A is a diagram illustrating an example appearance of an electronic device according to an example embodiment.

Referring to FIG. 4A, an electronic device 401a to which various example embodiments of this disclosure are able to be applied may include a display 410a and a housing 420a in appearance. Various circuits or modules such as a processor, a memory, and the like may be positioned inside the electronic device 401a (e.g., inside the housing 420a).

The display 410a may be positioned on a front surface of the electronic device 401a and may be exposed to the outside through the front surface. The display 410a may output content (e.g., a text, an image, a video, an icon, a widget, a symbol, or the like) or may receive a touch input (including a touch, a hovering, and a "force touch") from a user. To this end, the display 410a may include a cover glass, a display panel, a touch panel, and/or a pressure sensor, for example. A combination of at least one of the cover glass, the display panel, the touch panel, or the pressure sensor may have areas (e.g., the substantially the same area) corresponding to each other and may be positioned to be stacked (refer to FIG. 5).

The housing 420a may include at least a portion of an appearance of the electronic device 401a. To protect various elements inside the electronic device 401a from external impact or dust, the housing 420a may be formed of a plastic injection-molding material, a conductive material (e.g., metal), or a combinations thereof.

Figure 4B:
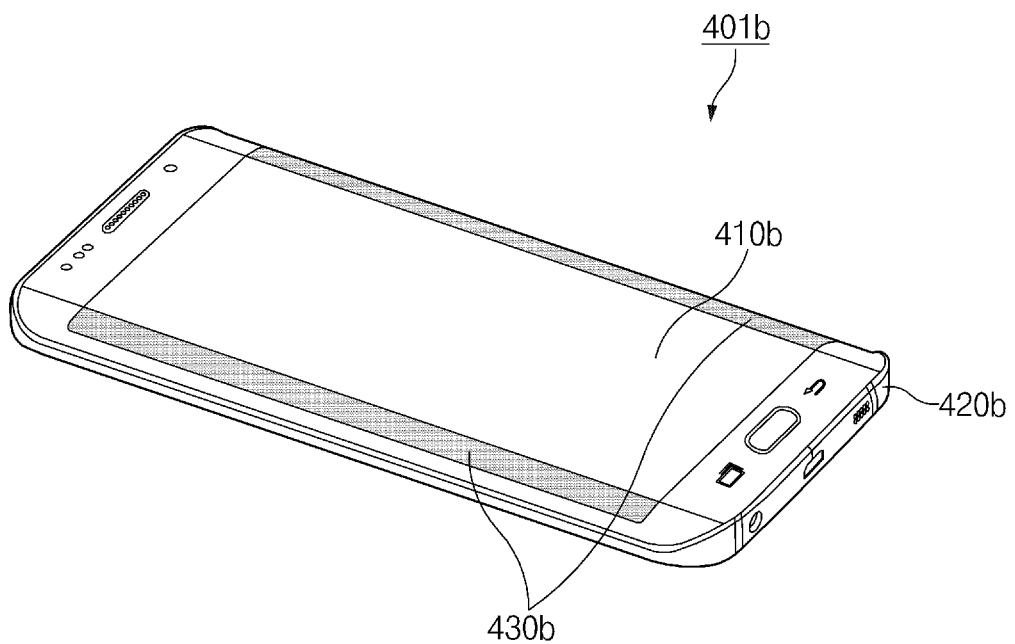

FIG. 4B is a diagram illustrating an example appearance of an electronic device according to another example embodiment.

Referring to FIG. 4B, as in the electronic device 401a illustrated in FIG. 4A, an electronic device 401b to which various embodiments of this disclosure are applied may include a display 410b and 430b and a housing 420b. Various circuits or modules such as a processor, a memory, and the like may be positioned inside the electronic device 401b (e.g., inside the housing 420b). With regard to FIG. 4A, a duplicated description may be omitted.

The display 410b and 430b may include a front surface region 410b positioned on a front surface of the electronic device 401b and a side surface region 430b expanded to at least one side of the front surface region 410b. For example, the side surface region 430b of the display may be positioned on a left side surface and a right side surface of the electronic device 401b and may be exposed to the outside in left and right side directions.

The housing 420a may include at least a portion of an appearance of the electronic device 401b. The left side surface and the right side surface of the housing 420b may constitute an appearance of left/right side surfaces appearance of the electronic device 401b together with the side surface region 430b of the display.

Figure 5:
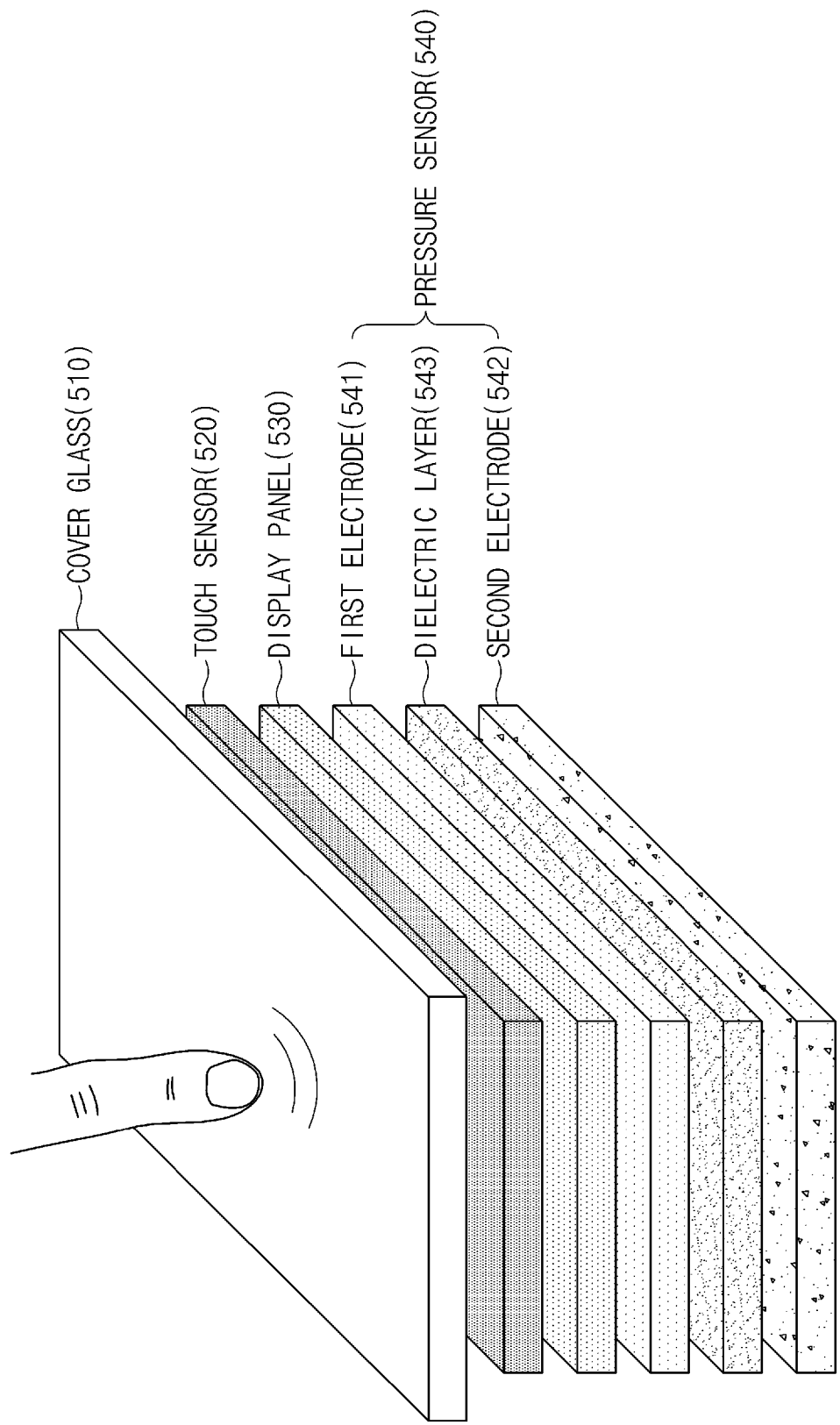
FIG. 5 is a diagram illustrating an example stacked structure of a display, according to an example embodiment.

FIG. 5 is a diagram illustrating an example of a stacked structure of a display, according to an example embodiment.

Referring to FIG. 5, a stacked structure of a display according to an embodiment is illustrated. For example, the stacked structure may be applied to the display 410a illustrated in FIG. 4A or the display 410b and 430b illustrated in FIG. 4B.

In the stacked structure of the display according to an embodiment, a cover glass 510 may pass light generated by a display panel 530. A user may touch a portion (e.g., a finger) of his/her body on the cover glass 510 to perform a "touch" (including a contact using an electronic pen). The cover glass 510 may be form of, for example, tempered glass, reinforced plastic, a flexible polymer material, or the like and may protect a display or an electronic device equipped with the display from an external shock. According to various embodiments, the cover glass 510 may be also referred to as a "glass window" or "cover window".

In a touch sensor 520, a specified physical quantity (e.g., a voltage, the intensity of light, resistance, the amount of charges, capacitance, or the like) may vary due to a touch from the user. For example, the touch sensor 520 may include a capacitive touch panel, a touch sensitive touch panel (or a resistive touch panel), an infrared touch panel, a piezo touch panel, or the like. According to various embodiments, the touch sensor 520 may be referred to as various names, such as a touch panel and the like, based on an implementation shape.

The display panel 530 may output content (e.g., a text, an image, a video, an icon, a widget, a symbol, or the like). For example, the display panel 530 may include, for example, and without limitation, a liquid crystal display (LCD) panel, a light-emitting diode (LED) display panel, an organic LED (OLED) display panel, a microelectromechanical systems (MEMS) display panel, or an electronic paper display panel.

According to various embodiments, the display panel 530 may be integrally implemented with the touch sensor 520. In this case, the display panel 530 combined with the touch sensor 520 may be also referred to as a "touchscreen panel (TSP)", a "touch sensitive display", or "touchscreen display panel".

A pressure sensor 540 may detect pressure (or force) of a touch from the user. For example, the pressure sensor 540 may detect a pressure value of a touch on the touch sensitive display (e.g., an assembly of the touch sensor 520 and the display panel 530). According to an embodiment, the pressure sensor 540 may include a first electrode 541, a second electrode 542, and a dielectric layer 543. For example, the pressure sensor 530a may sense the pressure of the touch based on capacitance between the first electrode 541a and the second electrode 542a, which varies due to the touch.

According to an embodiment, the first electrode 541 and/or the second electrode 542 may be implemented to be transparent or opaque. For example, if implemented to be opaque, the first electrode 541 and/or the second electrode 542 may include copper (Cu), silver (Ag), magnesium (Mg), titanium (Ti), or opaque graphene. Also, if implemented to be transparent, the first electrode 541 and/or the second electrode 542 may include indium thin oxide (ITO), indium zinc oxide (IZO), Ag nanowire, metal mesh, transparent conducting polymer, or transparent graphene.

For example, one of the first electrode 541 and the second electrode 542 may be implemented with a metal plate for ground, and the other thereof may be formed to have a repeated polygon pattern by using the above-described member (a so-called self-capacitance manner). For another example, one (e.g., a transmitting terminal Tx) of the first electrode 541 and the second electrode 542 may be formed with a pattern extending in a first direction, and the other (e.g., a receiving terminal Rx) thereof may be formed with a pattern extending in a second direction intersecting the first direction at a specified angle (e.g., a right angle) (a so-called mutual-capacitance manner).

The dielectric layer 543 may be implemented with a dielectric material, for example, silicon foam, silicon membrane, optical clean adhesive (OCA) sponge, rubber, or polymer (e.g., polycabonate (PC), polyethylene terephthalate (PET), or the like).

The stacked structure of the display above described with reference to FIG. 5 is an example and is able to be variously changed or modified. For example, the touch sensor 520 may be formed directly on a back surface of the cover glass 510 (a so-called cover glass integrated touch panel), may be inserted between the cover glass 510 and the display panel 530 after being separately manufactured (a so-called add-on touch panel), may be formed directly on the display panel 530 (a so-called on-cell touch panel), or may be included inside the display panel 530 (a so-called in-cell touch panel). Also, according to various embodiments, the first electrode 541 of the pressure sensor 540 may be attached to the display panel 530 after being formed in a circuit board (e.g., a FPCB) or may be formed directly on a back surface of the display panel 530. Also, according to various embodiments, the pressure sensor 540 may be included in the "touch sensitive display".

Figure 6:
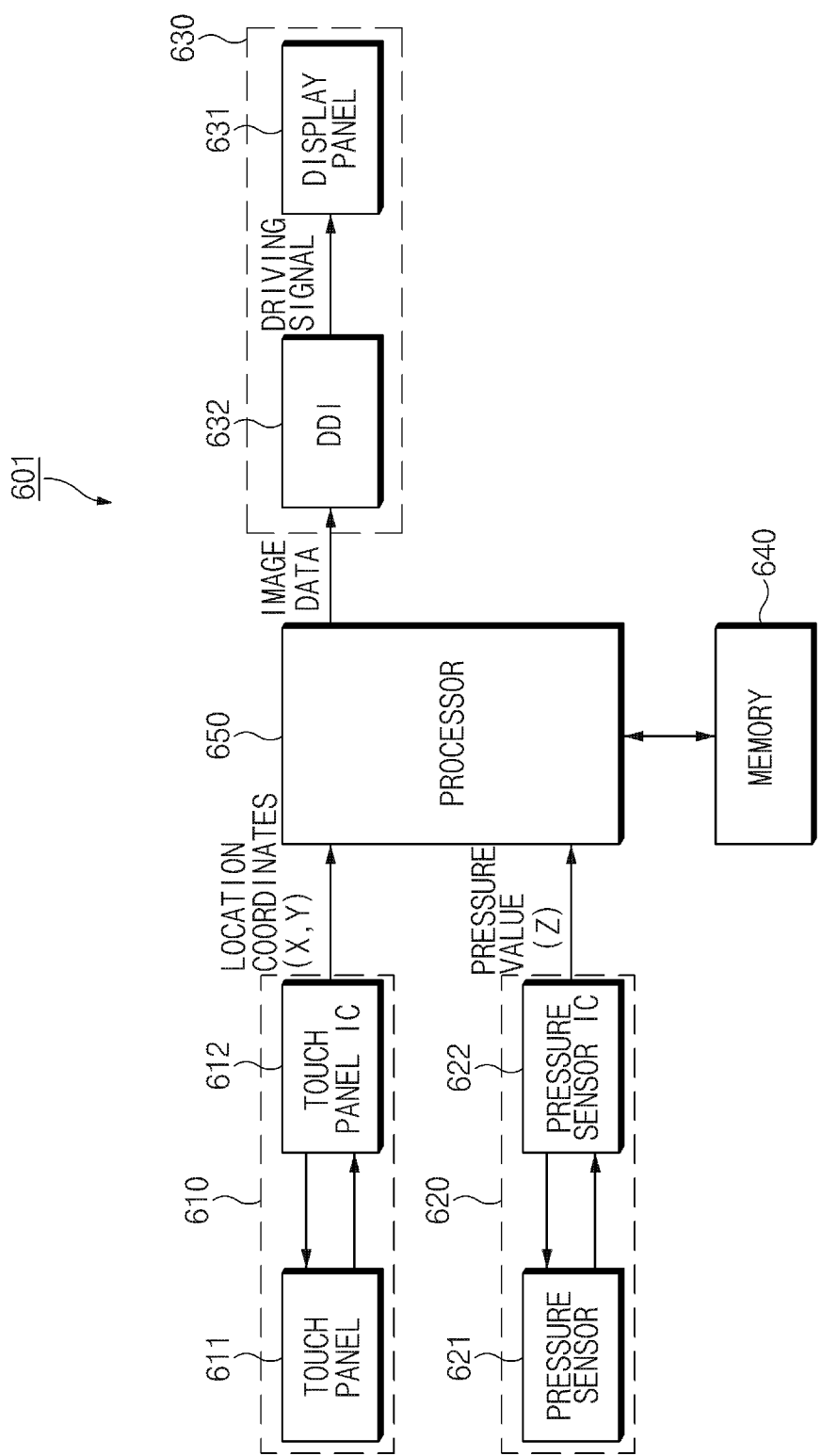
FIG. 6 is a block diagram illustrating an example electronic device, according to an example embodiment.

FIG. 6 is a block diagram illustrating an example electronic device, according to an example embodiment.

Referring to FIG. 6, an electronic device 601 according to an embodiment may include a touch panel module (e.g., including touch panel circuitry) 610, a pressure sensor module (e.g., including pressure sensing circuitry) 620, a display module (e.g., including a display panel) 630, a memory 640, and a processor (e.g., including processing circuitry) 650. With regard to FIGS. 1 to 5, duplicated descriptions of corresponding elements may be omitted.

The touch panel module 610 may include various touch panel circuitry and structures, such as, for example, and without limitation, a touch panel 611 and a touch panel integrated circuit (IC) 612. In the touch panel 611, a specified physical quantity (e.g., a voltage, the intensity of light, resistance, the amount of charges, capacitance, or the like) may vary due to a touch from the user. According to an embodiment, the touch panel 611 may be positioned to be overlaid with a display panel 631 (refer to FIG. 5).

The touch panel IC 612 may include circuitry to sense a variation in a physical quantity in the touch panel 611 and may calculate location coordinate (X, Y), at which a touch is made, based on the variation in the physical quantity (e.g., a voltage, resistance, capacitance, or the like). The calculated location coordinates (X, Y) may be provided to the processor 650 as a user input event. For example, if a portion (e.g., a finger) of a user body, a stylus (an example of an electronic pen), or the like makes contact with a glass (not illustrated) of a display, a coupling voltage between a transmitting terminal Tx and a receiving terminal Rx included in the touch panel 611 may vary. The variation in the coupling voltage may be sensed by the touch panel IC 612, and the touch panel IC 612 may report coordinates of a location, at which the touch is made, to the processor 650. The processor 650 may obtain data of the location coordinates as an event associated with a user input.

According to various embodiments, the touch panel IC 612 may be referred to as a "touch IC", a "touch screen IC", a "touch controller", a "touch screen controller IC", or the like. Meanwhile, according to various embodiments, in an electronic device in which the touch panel IC 612 is not included, the processor 650 may perform a role of the touch panel IC 612. According to various embodiments, the touch panel IC 612 and the processor 650 may be implemented with one element (e.g., one-chip). In addition, in this specification, that a processor senses a touch on a touch panel may mean that location coordinates (X, Y) of the touch on the touch panel 611 are reported to the processor 650 through the touch panel IC 612.

The pressure sensor module 620 may include various pressure sensing circuitry, such as, for example, and without limitation, a pressure sensor 621 and a pressure sensor IC 622. The pressure sensor 621 may detect pressure (or force) of a touch from the user. For example, in the pressure sensor 621, a physical quantity (e.g., capacitance) between the transmitting terminal Tx (e.g., the first electrode 541 of FIG. 5) and the receiving terminal Rx (e.g., the second electrode 542 of FIG. 5) may vary due to the touch. According to an embodiment, in the case where the pressure sensor 621 is implemented with a panel, the pressure sensor 621 may be positioned to be overlaid with the touch panel 611 or the display panel 631 (refer to FIG. 5). According to another embodiment, in the case where the pressure sensor 621 is implemented with at least one module, the pressure sensor 621 may be positioned on a back surface of the touch panel 611 or the display panel 631.

The pressure sensor IC 622 may include various circuitry to sense a variation in a physical quantity (e.g., capacitance or the like) in the pressure sensor 621 and may calculate pressure "Z" applied by a user touch based on the variation in the physical quantity. The pressure value may be provided to the processor 650 as a user input event, together with the location coordinates (X, Y) at which a touch is made.

According to various embodiments, the pressure sensor IC 622 may be referred to as a "force touch controller", a "force sensor IC", a "pressure panel IC", or the like. Also, according to various embodiments, the pressure sensor IC 622 may be implemented with one element (e.g., one-chip) together with the touch panel IC 612. In addition, in this specification, that a pressure sensor detects a pressure value of a touch on a touch panel may mean that pressure of a touch on the touch panel 611 varies a specified physical quantity of the pressure sensor 621 and the pressure sensor IC 622 converts the variation in the physical quantity into the pressure value "Z" and reports the pressure value "Z" to the processor 650.

The display module (may be referred simply to as a "display") may include the display panel 631 and a display driving integrated circuit (DDI) 632. The display panel 631 may receive an image driving signal from the display driving integrated circuit (DDI) 632. The display panel 631 may display a variety of content (e.g., a text, an image, a video, an icon, a symbol, and the like) based on the image driving signal. According to an embodiment, the display panel 631 may be combined with the touch panel 611 and/or the pressure sensor 621 in a stacked manner.

The display driving integrated circuit (DDI) 632 may supply the display panel 631 with an image driving signal corresponding to image data received from the processor 650 (a host) at a predetermined frame rate. Although not illustrated in FIG. 6, according to various embodiments, the display driving integrated circuit 632 may include a graphics RAM, an interface module, an image processing unit, a multiplexer, a display timing controller (T-con), a source driver, a gate driver, and/or an oscillator.

Also, in this disclosure, that the processor 650 displayed (or outputted) a screen, a graphic effect, a graphic user interface (GUI) object, or the like (hereinafter referred as a "screen" or the like) in a display 630 may refer, for example, to a situation in which the screen or the like is displayed on the display panel 631 through operations in which the processor 650 provides the display driving integrated circuit (DDI) 632 with image data associated with the screen or the like and the display driving integrated circuit (DDI) 632 supplies the display panel 631 with an image driving signal corresponding to the image data.

The memory 640 may store commands or data associated with operations of elements included in the electronic device 601. For example, the memory 640 may store instructions that, when executed, cause the processor 650 to perform various operations (e.g., refer to FIGS. 7 to 15) disclosed in this specification.

For example, the processor 650 may include various processing circuitry and be electrically connected with the elements 610 to 640 included in the electronic device 601 and may execute operations or data processing associated with control and/or communication of the elements 610 to 640 included in the electronic device 601.

According to an embodiment, the processor 650 may sense a touch on the touch panel 611 through the touch panel IC 612. For example, the processor 650 may identify and sense at least one touch based on continuity of a contact surface on the touch panel 611, which makes contact with a portion (e.g., a finger) of a body of a user.

For example, the processor 650 may distinguish and sense a first touch and a second touch that are made at the same time or at different times. Each of the first touch and the second touch may include a single touch or a plurality of touches. For example, the touch may include not only a touch having a touch point (or a press point) but also touches (a so-called multi-touch) having a plurality of touch points positioned adjacent to each other.

Also, according to an embodiment, the processor 650 may detect pressure of a touch on the touch panel 611 using the pressure sensor 621 and the pressure sensor IC 622. For example, the processor 650 may detect pressure of the first touch and the second touch that are made at the same time or at different times. Accordingly, the processor 650 may obtain location coordinates of the first touch and the second touch and a pressure value of each of the first touch and the second touch. In this case, a touch of a specified pressure value or more may be referred to as a so-called "force touch".

According to an embodiment, if the first touch and the second touch are sensed, the processor 650 may display a first region, which is gradually expanded with respect to a location at which the first touch is made, on the display 630 and may display a second region, which is gradually expanded with respect to a location at which the second touch is made, on the display 630.

According to an embodiment, if a sum of a pressure value of the first touch and a pressure value of the second touch exceed a specified value, the processor 650 may display, on the display 630, the first region that is gradually expanding with respect to the location at which the first touch is made and the second region that is gradually expanding with respect to the location at which the second touch is made.

According to an embodiment, the first region and the second region may have various shapes. For example, the first region and the second region may have various shapes such as a circle, an ellipse, a polygon, a star-shape, and the like.

Also, according to an embodiment, a specific graphic effect may be applied to the interiors of the first region and the second region. For example, an image specified in advance or an image of a corresponding partial region of a screen to be displayed later may be displayed in the interiors of the first region and the second region.

For another example, properties (e.g., hue, saturation, and value) of color may be variously applied to the interiors of the first region and the second region, depending on pressure or contact areas of the first touch and the second touch. For example, a saturation determined from on a pressure value of the first touch may be applied to the first region, and a saturation determined from a pressure value of the second touch may be applied to the second region. For example, if a pressure value of the first touch is large, a relatively high saturation may be applied to the interior of the first region; if a pressure value of the first touch is small, a relatively low saturation may be applied to the interior of the first region.

Also, according to an embodiment, each of the first region and the second region may be gradually expanding with respect to a location at which a touch is made. In this case, expanding speeds of the first region and the second region may dynamically vary according to properties of the first touch and the second touch.

For example, an expanding speed of the first region may be determined depending on a contact area of the first touch on the touch panel 611, and an expanding speed of the second region may be determined depending on a contact area of the second touch on the touch panel 611. For another example, an expanding speed of the first region may be determined depending on a pressure value of the first touch on the touch panel 611, and an expanding speed of the second region may be determined depending on a pressure value of the second touch on the touch panel 611.

For example, in the case where the first touch (or second touch) of the user has relatively high pressure, a contact area of the first touch (or second touch) on the touch panel 611 may become relatively wide. When the contact area of the first touch (or second touch) becomes relatively wide, the processor 650 may adaptively adjust an expanding speed of the first region (or second region) corresponding to the first touch (or second touch).

Figure 8:
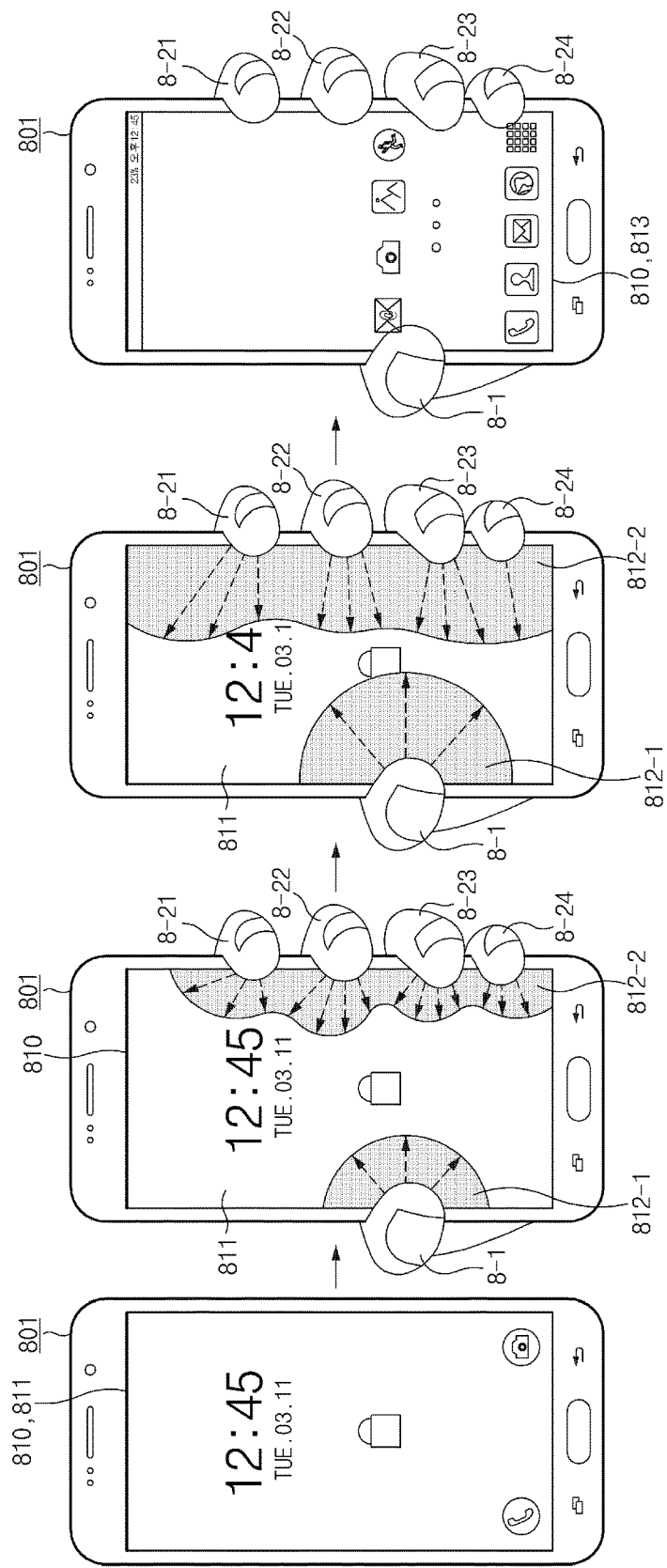
FIG. 8 is a diagram illustrating an example electronic device in which a screen outputting method according to an example embodiment is implemented.

According to an embodiment, if a sum of an area of the first region and an area of the second region exceeds a specified value (or ratio) (e.g., 50% of the whole area of the display panel 611), the processor 650 may display a specified screen on the display 630 (refer to FIG. 8). Alternatively, if a sum of an area of the first region and an area of the second region exceeds the specified value and the first region and the second region cross each other, the processor 650 may display the specified screen on the display 630 (refer to FIG. 9). According to various embodiments, if the first region and the second region cross each other regardless of a sum of an area of the first region and an area of the second region, the processor 650 may display the specified screen on the display 630.

According to an embodiment, the specified screen may be variously set. For example, the specified screen may include an unlocked home screen. Besides, the specified screen may include various screens including a lock screen, an execution screen of a specific application, a screen including information, such as weather, schedule, calendar, and the like, which is set in advance, and the like.

According to various embodiments, an electronic device may be in an idle state (or sleep state) when a first touch and a second touch of a user are made. In this case, the display 630 may be off. If the first touch and the second touch are made when the display 630 is off and if a pressure value of at least one of the first touch or the second touch is larger than a specified value, the processor 650 may activate at least a portion of the display 630. Afterwards, the processor 650 may display a first region corresponding to the first touch and a second region corresponding to the second touch on the display 630 and may display a specified screen.

Also, according to various embodiments, user authentication may be performed based on the first touch and the second touch. For example, the processor 650 may register a touch location and/or pressure of a legal user based on a location and/or pressure of each of the first touch and the second touch in a registration step. Afterwards, for example, the processor 650 may authenticate the user by using a location, at which the first touch of the user is made, and/or a pressure value of the first touch and a location, at which the second touch of the user is made, and/or a pressure value of the second touch in the authentication step. If the user is authenticated, the processor 650 may display the first region and the second region on the display 630 and may display the specified screen.

According to various embodiments, an application to be executed may be determined according to the first touch and the second touch. For example, the processor 650 may register (set) an application to be executed, based on a location and/or pressure of each of the first touch and the second touch in the registration step. Afterwards, for example, the processor 650 may determine a to-be-executed application by using a location, at which the first touch of the user is made, and/or a pressure value of the first touch and a location, at which the second touch of the user is made, and/or a pressure value of the second touch in an application determination step. If the application is determined, the processor 650 may display the first region and the second region on the display 630. After the determined application is executed, the processor 650 may display an execution screen (an example of the specified screen) of the determined application.

For example, the execution screen may correspond to a screen rendered according to activity set to the determined application in advance. For example, the application may include extremely diverse applications such as a home application, a camera application, an emergency call application, an image viewer application, an e-book reader application, a health care application, a web browser application, or the like.

The above-described operation of the processor 650 is, but is not limited to, an example. For example, an operation of a processor described in other parts of this specification should be understood as an operation of the processor 650. Also, in this specification, at least some of operations described as an operation of an "electronic device" should be understood as an operation of the processor 650.

Figure 7:
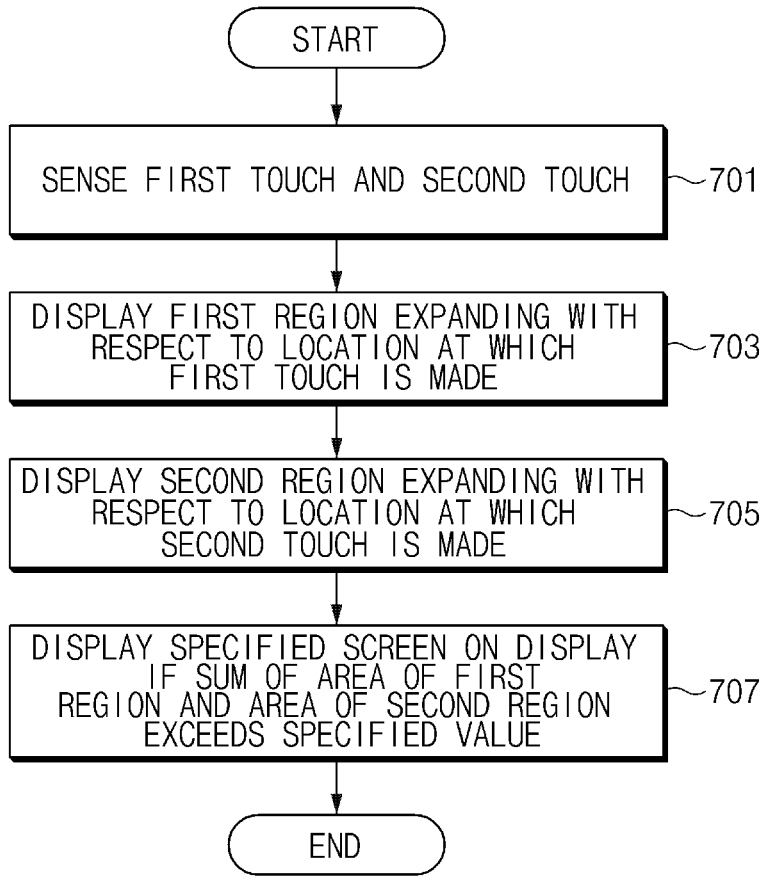
FIG. 7 is a flowchart illustrating an example screen outputting method according to an example embodiment.

FIG. 7 is a flowchart illustrating an example screen outputting method according to an example embodiment.

Referring to FIG. 7, the screen outputting method according to an example embodiment may include operation 701 to operation 707. Operation 701 to operation 707 may be performed by, for example, the electronic device 601 illustrated in FIG. 6. Operation 701 to operation 707 may be respectively implemented with, for example, instructions that are capable of being performed (or executed) by the processor 650 of the electronic device 601. The instructions may be stored in, for example, a computer-readable recording medium or the memory 640 of the electronic device 601 illustrated in FIG. 6. Below, reference numerals of FIG. 6 are used to describe operation 701 to operation 707, and it is assumed that the display 630 of the electronic device 601 is on.

In operation 701, the processor 650 may sense a first touch and a second touch on the touch panel 611. According to an embodiment, the processor 650 may detect a pressure value of the first touch and a pressure value of the second touch by using the pressure sensor module 620.

In operation 703, the processor 650 may display, on the display 630, a first region expanding with respect to a location at which the first touch is made.

In operation 705, the processor 650 may display, on the display 630, a second region expanding with respect to a location at which the second touch is made.

An order of operation 703 and operation 705 is not limited to FIG. 7, and the second region corresponding to the second touch may be displayed prior to the first region or may be displayed at the same time with the first region.

According to an embodiment, operation 703 and operation 705 may be performed in the case where a sum of pressure values of the first and second touches detected in operation 701 exceeds a specified value.

Also, according to an embodiment, in operation 703 and operation 705, a color property (e.g., hue, saturation, or value) determined from the pressure value of the first touch may be applied to the first region. A color property (e.g., hue, saturation, or value) determined from the pressure value of the second touch may be applied to the second region.

Also, according to an embodiment, in operation 703 and operation 705, an expanding speed of the first region may be determined according to a contact area of the first touch or the pressure value of the first touch. An expanding speed of the second region may be determined according to a contact area of the second touch or the pressure value of the second touch.

In operation 707, if a sum of an area of the first region and an area of the second region exceeds a specified value (or ratio) (e.g., 50% of the whole area of the display panel 611), the processor 650 may display a specified screen on the display 630. For example, the specified screen may include various screens including a lock screen, an execution screen of a specific application, a screen including information set in advance, and the like.

According to an embodiment, in operation 707, if a sum of an area of the first region and an area of the second region exceeds the specified value and the first region and the second region cross each other, the processor 650 may display the specified screen on the display 630.

FIG. 8 is a diagram illustrating an example electronic device in which a screen outputting method according to an example embodiment is implemented.

An electronic device 801 in which a screen outputting method according to an embodiment is implemented in response to a touch of the user is illustrated in FIG. 8. For example, the electronic device 801 may correspond to the electronic device 601 of FIG. 6.

According to an embodiment, a lock screen 811 may be displayed (or output) in a display 810 of the electronic device 801. A clock, a date, an icon of an application specified in advance, and the like may be included in the lock screen 811.

According to an embodiment, the user may grip the electronic device 801 by using his/her left hand. For example, when the electronic device 801 is gripped, a thumb 8-1 of the user may make contact with a left side of the display 810, and the remaining four fingers 8-21, 8-22, 8-23, and 8-24 may make contact with a right side of the display 810. A first touch may be implemented when the thumb 8-1 makes contact with the left side of the display 810. Also, a second touch may be implemented when the remaining four fingers 8-21, 8-22, 8-23, and 8-24 make contact with the right side of the display 810.

If the first touch and the second touch are made, the electronic device 801 may display a first region 812-1 which gradually expands starting from a location at which the first touch is made, and may display a second region 812-2, which gradually expands starting from a location at which the second touch is made. A portion of the previously displayed lock screen 811 may be displayed in the remaining region of the display 810 other than the first region 812-1 and the second region 812-2.

For example, the first region 812-1 and the second region 812-2 may have various shapes. For example, each of the first region 812-1 and the second region 812-2 may have a shape that is radiated from a contact point (or pressure point) of each touch, as illustrated in FIG. 8.

For example, a specific graphic effect may be applied to the interiors of the first region 812-1 and the second region 812-2. For example, an image (e.g., an image to which color gradation using a fluorescent color is applied) that is specified in advance may be displayed in the interiors of the first region 812-1 and the second region 812-2.

For example, color properties (e.g., hue, saturation, and value) may be adaptively applied to the interiors of the first region 812-1 and the second region 812-2, based on pressure or contact area of the first touch and the second touch. For example, a saturation determined from a pressure value of the first touch may be applied to the first region 812-1, and a saturation determined from a pressure value of the second touch may be applied to the second region 812-2. For example, if a pressure value of the first touch is large, a relatively high saturation may be applied to the interior of the first region 812-1; if a pressure value of the first touch is small, a relatively low saturation may be applied to the interior of the second region 812-2.

According to an embodiment, each of the first region 812-1 and the second region 812-2 may gradually expand starting from the location where each of touches has been made. An area of the previously displayed lock screen 811 may be reduced according to expansion of the first region 812-1 and the second region 812-2. In this case, expanding speeds of the first region 812-1 and the second region 812-2 may dynamically vary according to properties of the first touch and the second touch.

For example, an expanding speed of the first region 812-1 may be determined based on a contact area of the first touch on the display 810 (a touch panel of the display 810), and an expanding speed of the second region 812-2 may be determined based on a contact area of the second touch on the display 810.

For another example, an expanding speed of the first region 812-1 may be determined based on a pressure value of the first touch, and an expanding speed of the second region 812-2 may be determined based on a pressure value of the second touch.

For example, in the case where the first touch (or second touch) of the user has relatively high pressure, a contact area of the first touch (or second touch) on the display 810 may become relatively wide. When the contact area of the first touch (or second touch) becomes relatively wide, the electronic device 801 may adaptively adjust the expanding speed of the first region (or second region) corresponding to the first touch (or second touch).

According to an embodiment, if a sum of an area of the expanded first region 812-1 and an area of the expanded second region 812-2 exceeds a specified value (or ratio) (e.g., 50% of the whole area of the display 810), the electronic device 801 may display an unlocked home screen 813 (an example of a specified screen) on the display 810.

Figure 9:
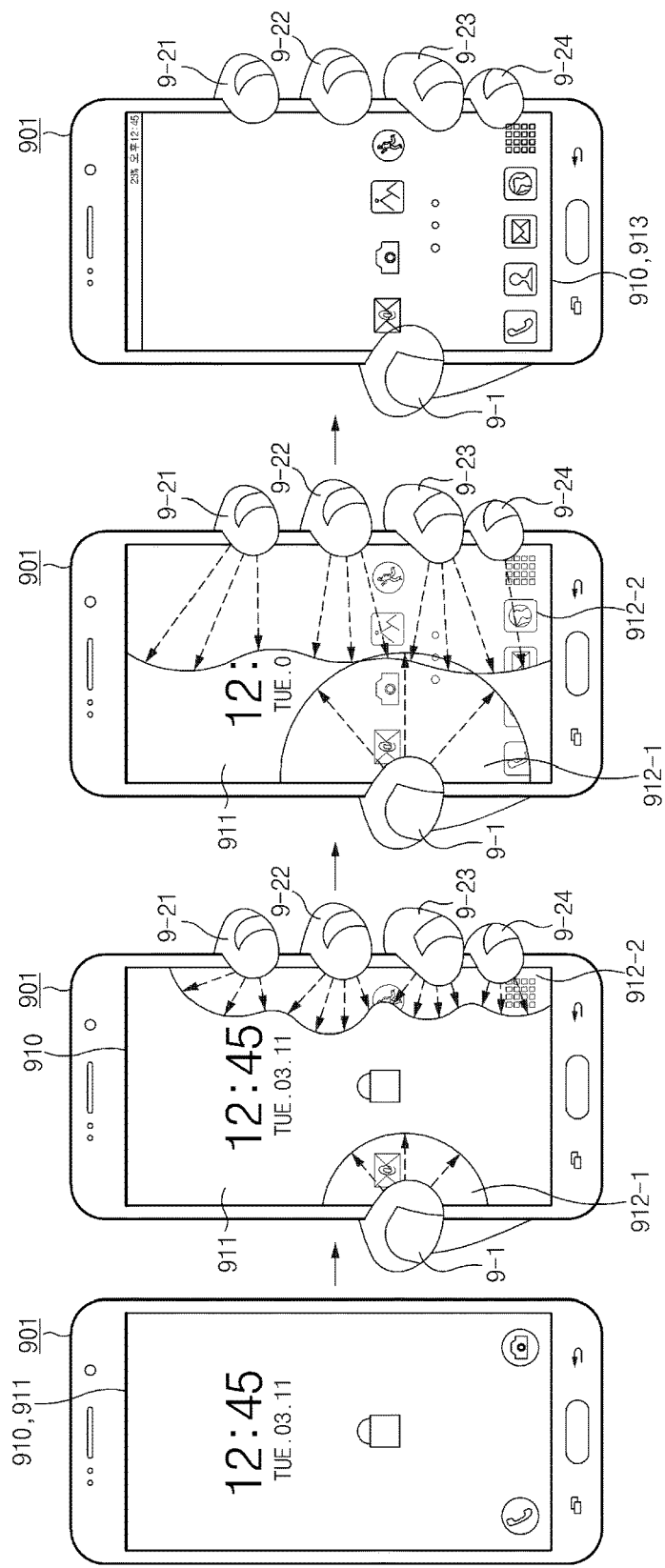
FIG. 9 is a diagram illustrating an example electronic device in which a screen outputting method according to another example embodiment is implemented.

FIG. 9 is a diagram illustrating an example electronic device in which a screen outputting method according to another example embodiment is implemented.

An electronic device 901 in which a screen outputting method according to an embodiment is implemented in response to a touch of the user is illustrated in FIG. 9. For example, the electronic device 901 may correspond to the electronic device 601 of FIG. 6. In the description of the electronic device 901, the descriptions duplicated with the description of the electronic device 801 of FIG. 8 may not be repeated here.

According to an embodiment, a lock screen 911 may be displayed (or output) in a display 910 of the electronic device 901.

According to an embodiment, the user may grip the electronic device 901 by using his/her left hand. For example, when the electronic device 901 is gripped, a thumb 9-1 of the user may make contact with a left side of the display 910, and the remaining four fingers 9-21, 9-22, 9-23, and 9-24 may make contact with a right side of the display 910. A first touch may be implemented when the thumb 9-1 makes contact with the left side of the display 910. Also, a second touch may be implemented when the remaining four fingers 9-21, 9-22, 9-23, and 9-24 make contact with the right side of the display 910.

If the first touch and the second touch are made, the electronic device 901 may display a first region 912-1 which is gradually expanding with respect to a location at which the first touch is made and may display a second region 912-2 which is gradually expanding with respect to a location at which the second touch is made. A portion of the previously displayed lock screen 911 may be displayed in the remaining region of the display 910 other than the first region 912-1 and the second region 912-2.

For example, a specific graphic effect may be applied to the interiors of the first region 912-1 and the second region 912-2. For example, images of partial regions, which correspond to the first region 912-1 and the second region 912-2, of a home screen 913 to be displayed later may be displayed in the interiors of the first region 912-1 and the second region 912-2. As such, the electronic device 901 may have the effect that a home screen 913 disposed under the lock screen 911 is exposed as the lock screen 911 is taken off in response to the first touch and the second touch.

Also, for example, color properties (e.g., hue, saturation, and value) may be adaptively applied to the interiors of the first region 912-1 and the second region 912-2, based on pressure or contact areas of the first touch and the second touch. For example, a value determined from a pressure value of the first touch may be applied to the first region 912-1, and a value determined from a pressure value of the second touch may be applied to the second region 912-2. For example, if a pressure value of the first touch is large, a relatively high value may be applied to the interior of the first region 912-1; if a pressure value of the first touch is small, a relatively low value may be applied to the interior of the second region 912-2.

According to an embodiment, each of the first region 912-1 and the second region 912-2 may gradually expand with respect to a location at which a touch is made. In this case, expanding speeds of the first region 912-1 and the second region 912-2 may dynamically vary according to properties (e.g., contact areas, pressure values, or the like) of the first touch and the second touch.

According to an embodiment, if a sum of an area of the expanded first region 912-1 and an area of the expanded second region 912-2 exceeds a specified value (or ratio) and the first region 912-1 and the second region 912-2 cross each other, the electronic device 901 may display the unlocked home screen 913 (an example of a specified screen) on the display 910. According to various embodiments, if the first region 912-1 and the second region 912-2 cross each other regardless of a sum of an area of the first region 912-1 and an area of the second region 912-2, the electronic device 901 may display the specified screen on the display 910.

Figure 10:
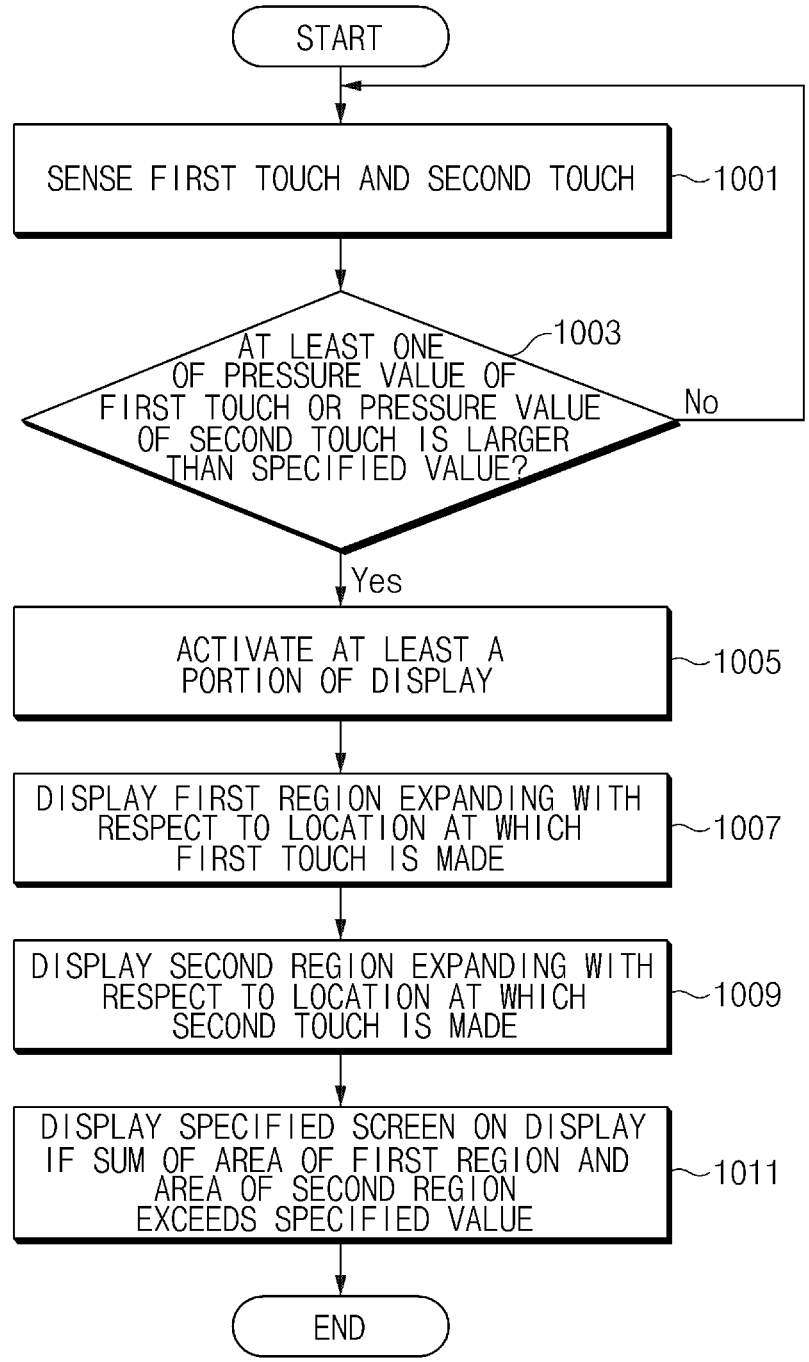
FIG. 10 is a flowchart illustrating an example screen outputting method according to another example embodiment.

FIG. 10 is a flowchart illustrating an example screen outputting method according to another example embodiment.

Referring to FIG. 10, the screen outputting method according to an embodiment may include operation 1001 to operation 1011. Operation 1001 to operation 1011 may be executed by, for example, the electronic device 601 illustrated in FIG. 6. For example, each of operation 1001 to operation 1011 may be implemented with instructions to be performed (or executed) by the processor 650 of the electronic device 601. The instructions may be stored in, for example, the memory 640 of the electronic device 601. Below, reference numerals of FIG. 6 are used to describe the method of FIG. 10, and it is assumed that the display 630 of the electronic device 601 is off. Operations 1007 to 1011 correspond to operations 703 to 707 of FIG. 7, and a detailed description thereof is thus omitted.

In operation 1001, the processor 650 may sense a first touch and a second touch on the touch panel 611. According to an embodiment, the processor 650 may detect a pressure value of the first touch and a pressure value of the second touch by using the pressure sensor module 620.

In operation 1003, the processor 650 may determine whether at least one of the pressure value of the first touch or the pressure value of the second touch is larger than a specified value. If at least one of the pressure value of the first touch or the pressure value of the second touch is larger than the specified value ("Yes" in operation 1003), the process may proceed to operation 1005; if not ("No" in operation 1003), the process may return to operation 1001.

In operation 1005, since at least one of the pressure value of the first touch or the pressure value of the second touch is larger than the specified value, the processor 650 may activate (or turn on) at least a portion of the display 630. For example, the processor 650 may activate the display driving integrated circuit 632 and may activate at least a portion (e.g., portions corresponding to first region and second region to be displayed later) of the display panel 631.

In operation 1007, the processor 650 may display, on the display 630 (the display panel 631 of the display 630), the first region expanding with respect to a location at which the first touch is made.

In operation 1009, the processor 650 may display, on the display 630 (the display panel 631 of the display 630), the second region expanding with respect to a location at which the second touch is made.

An order of operation 1007 and operation 1009 is not limited to FIG. 10, and the second region corresponding to the second touch may be displayed prior to the first region or may be displayed at the same time with the first region.

In operation 1011, if a sum of an area of the first region and an area of the second region exceeds a specified value (or ratio) (e.g., 50% of the whole area of the display panel 611), the processor 650 may display a specified screen on the display 630.

Figure 11:
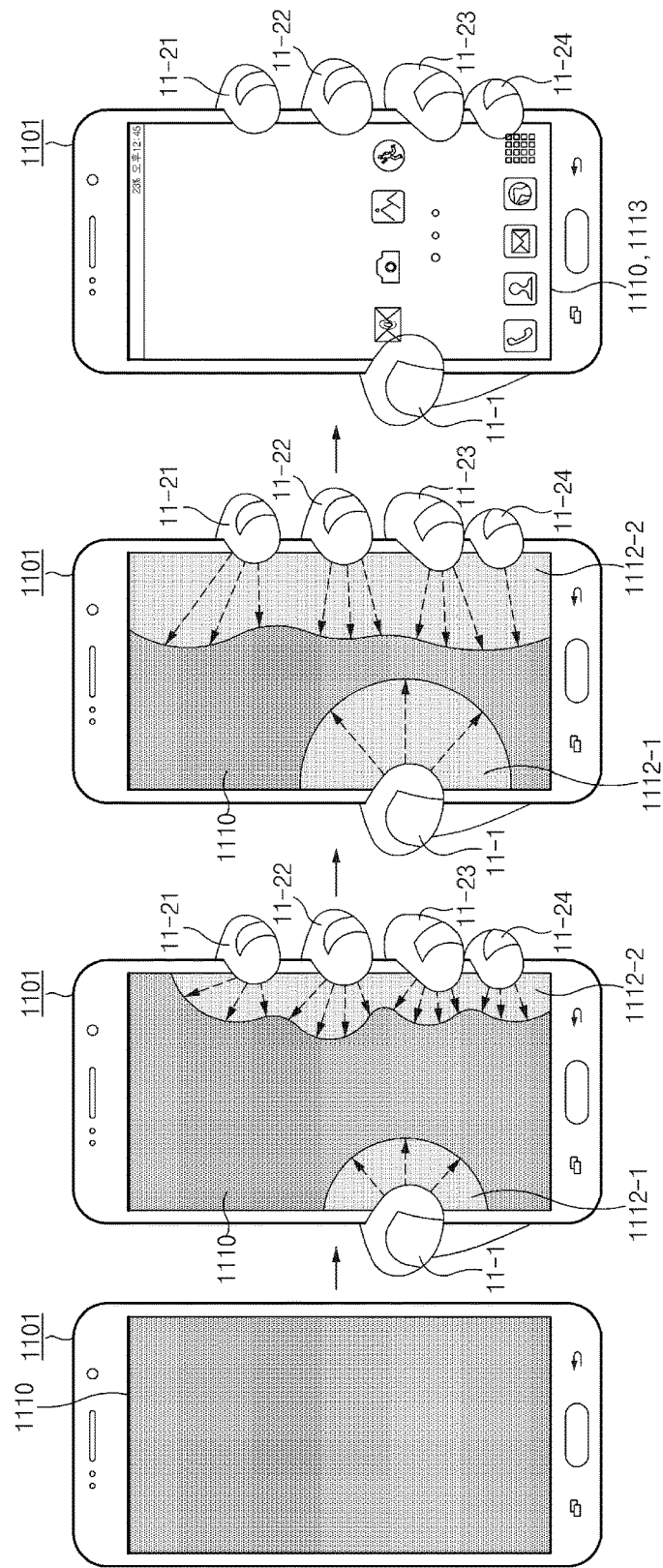
FIG. 11 is a diagram illustrating an example electronic device, in which the screen outputting method according to an example embodiment is implemented, when a display is off.

FIG. 11 is a diagram illustrating an example electronic device, in which a screen outputting method according to an example embodiment is implemented, when a display is off.

An electronic device 1101 in which a screen outputting method according to an embodiment is implemented in response to a touch of the user is illustrated in FIG. 11. For example, the electronic device 1101 may correspond to the electronic device 601 of FIG. 6. In the description of the electronic device 1101, content to which the descriptions of the electronic device 801 of FIG. 8 and the electronic device 901 of FIG. 9 are applied may not be repeated here.

According to an embodiment, the electronic device 1101 may be in an idle state (or sleep state). In this case, the display 1110 may be off. According to various embodiments, in the case where the electronic device 1101 is in the idle state, an idle screen (a so-called always-on display (AOD)) in which a clock, a date, and the like are displayed may be displayed.

According to an embodiment, the user may grip the electronic device 1101 by using his/her left hand. For example, when the electronic device 1101 is gripped, a thumb 11-1 of the user may make contact with a left side of the display 1110, and the remaining four fingers 11-21, 11-22, 11-23, and 11-24 may make contact with a right side of the display 1110. A first touch may be implemented when the thumb 11-1 makes contact with the left side of the display 1110. Also, a second touch may be implemented when the remaining four fingers 11-21, 11-22, 11-23, and 11-24 make contact with the right side of the display 1110.

According to an embodiment, if at least one of a pressure value of the first touch or a pressure value of the second touch is larger than the specified value, that is, at least one of the first touch or the second touch corresponds to a force touch, the electronic device 1101 may activate (or turn on) at least a portion of the display 1110. For example, the electronic device 1101 may activate at least a portion (e.g., portions corresponding to first and second regions to be displayed later) of the display 1110.

If the first touch and the second touch are made, the electronic device 1101 may display a first region 1112-1, which is gradually expanding with respect to a location at which the first touch is made, on the display 1110 and may display a second region 1112-2, which is gradually expanding with respect to a location at which the second touch is made, on the display 1110. The remaining region of the display 1110 other than the first region 1112-1 and the second region 1112-2 may be still deactivated (or off), or the always-on display may be output in the remaining region.

For example, a specific graphic effect may be applied to the interiors of the first region 1112-1 and the second region 1112-2. For example, images that are specified in advance or images of some areas, which correspond to the first region 1112-1 and the second region 1112-2, of a home screen 1113 to be displayed later may be displayed in the interiors of the first region 1112-1 and the second region 1112-2.

Also, for example, color properties (e.g., hue, saturation, and value) may be adaptively applied to the interiors of the first region 1112-1 and the second region 1112-2, based on pressure or contact areas of the first touch and the second touch.

According to an embodiment, each of the first region and the second region may be gradually expanding with respect to a location at which a touch is made. In this case, expanding speeds of the first region 1112-1 and the second region 1112-2 may dynamically vary according to properties (e.g., contact areas, pressure values, or the like) of the first touch and the second touch.

According to an embodiment, if a sum of an area of the expanded first region 1112-1 and an area of the expanded second region 1112-2 exceeds a specified value (or ratio), the electronic device 1101 may display the unlocked home screen 1113 (an example of a specified screen) on the display 1110. According to another embodiment, if the first region 1112-1 and the second region 1112-2 cross each other, the electronic device 1101 may display the unlocked home screen 1113 on the display 1110.

Figure 12:
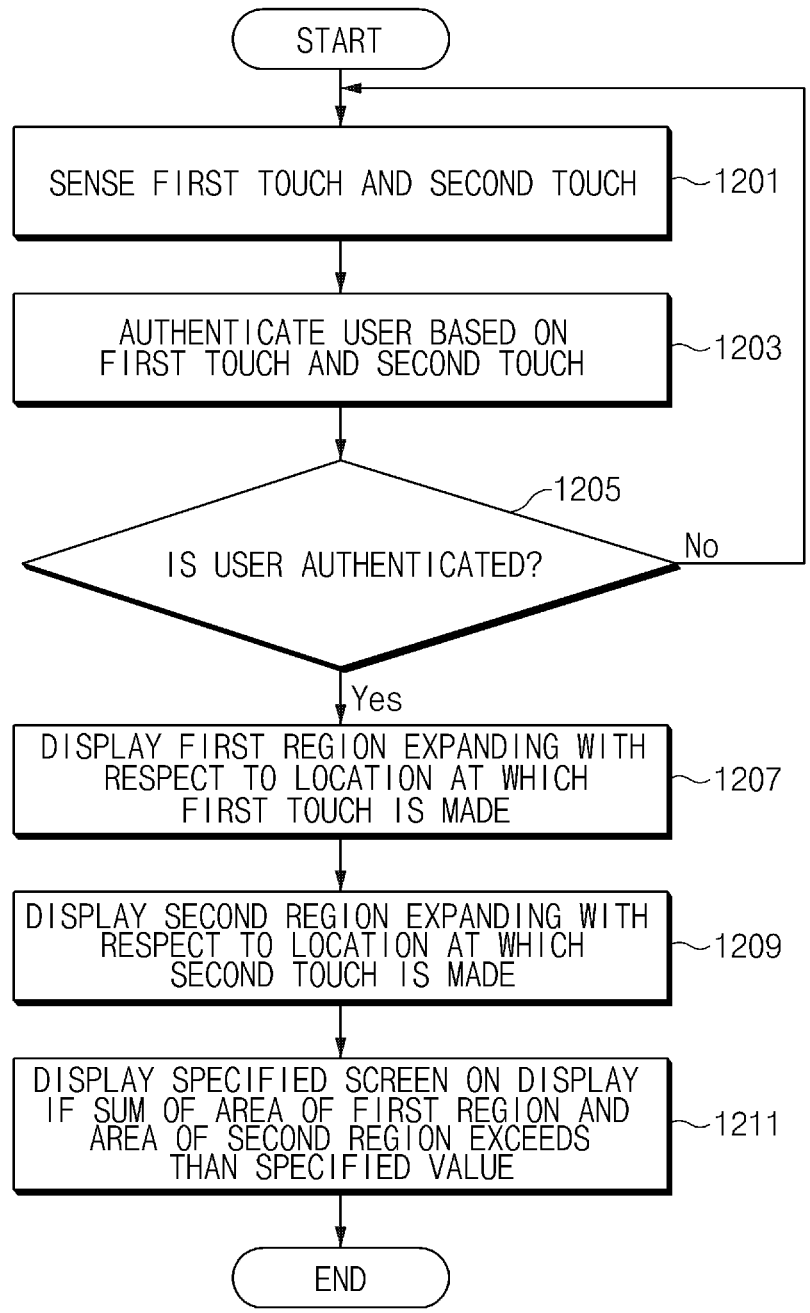
FIG. 12 is a flowchart illustrating an example screen outputting method to which user authentication is applied, according to an example embodiment.

FIG. 12 is a flowchart illustrating an example screen outputting method to which user authentication is applied, according to an example embodiment.

Referring to FIG. 12, the screen outputting method according to an embodiment may include operation 1201 to operation 1211. Operation 1201 to operation 1211 may be executed by, for example, the electronic device 601 illustrated in FIG. 6. For example, each of operation 1201 to operation 1211 may be implemented with instructions to be performed (or executed) by the processor 650 of the electronic device 601. The instructions may be stored in, for example, the memory 640 of the electronic device 601. Below, reference numerals of FIG. 6 are used to describe the method of FIG. 12, and it is assumed that the display 630 of the electronic device 601 is on. Operations 1207 to 1211 correspond to operations 703 to 707 of FIG. 7, and a detailed description thereof is thus omitted.

In operation 1201, the processor 650 may sense a first touch and a second touch on the touch panel 611. According to an embodiment, the processor 650 may detect location coordinates and/or pressure values of the first touch and the second touch.

In operation 1203, the processor 650 may authenticate the user based on the first touch and the second touch. For example, the processor 650 may authenticate the user based on locations at which the first touch and the second touch are made and/or pressure values of the first touch and the second touch. For example, the processor 650 may authenticate the user by determining whether the location coordinates and/or pressure values of the first touch and the second touch are matched to location coordinates and/or pressure values of the first touch and the second touch stored (or registered) in the memory 640.

In operation 1205, the processor 650 may determine whether the user is authenticated. If the user is successfully authenticated ("Yes" in operation 1205), the method may proceed to operation 1207; if not ("No" in operation 1205), the method may return to operation 1201.

Since the user is authenticated, in operation 1207, the processor 650 may display, on the display 630 (the display panel 631 of the display 630), the first region expanding with respect to a location at which the first touch is made.

In operation 1209, the processor 650 may display, on the display 630 (the display panel 631 of the display 630), the second region expanding with respect to a location at which the second touch is made.

An order of operation 1207 and operation 1209 is not limited to FIG. 10, and the second region corresponding to the second touch may be displayed prior to the first region or may be displayed at the same time with the first region.

In operation 1211, if a sum of an area of the first region and an area of the second region exceeds a specified value (or ratio) (e.g., 50% of the whole area of the display panel 611), the processor 650 may display a specified screen on the display 630.

Each operation of FIG. 12 is described under the assumption that the display 630 of the electronic device 601 is on. However, according to various embodiments, the display 630 may be off. In the case where the display 630 is off, if it is determined that at least one of a pressure value of the first touch sensed in operation 1201 or a pressure value of the second touch sensed in operation 1201 is larger than a specified value, the processor 650 may activate at least a portion of the display 630 prior to the user authentication of operation 1203.

Figure 13:
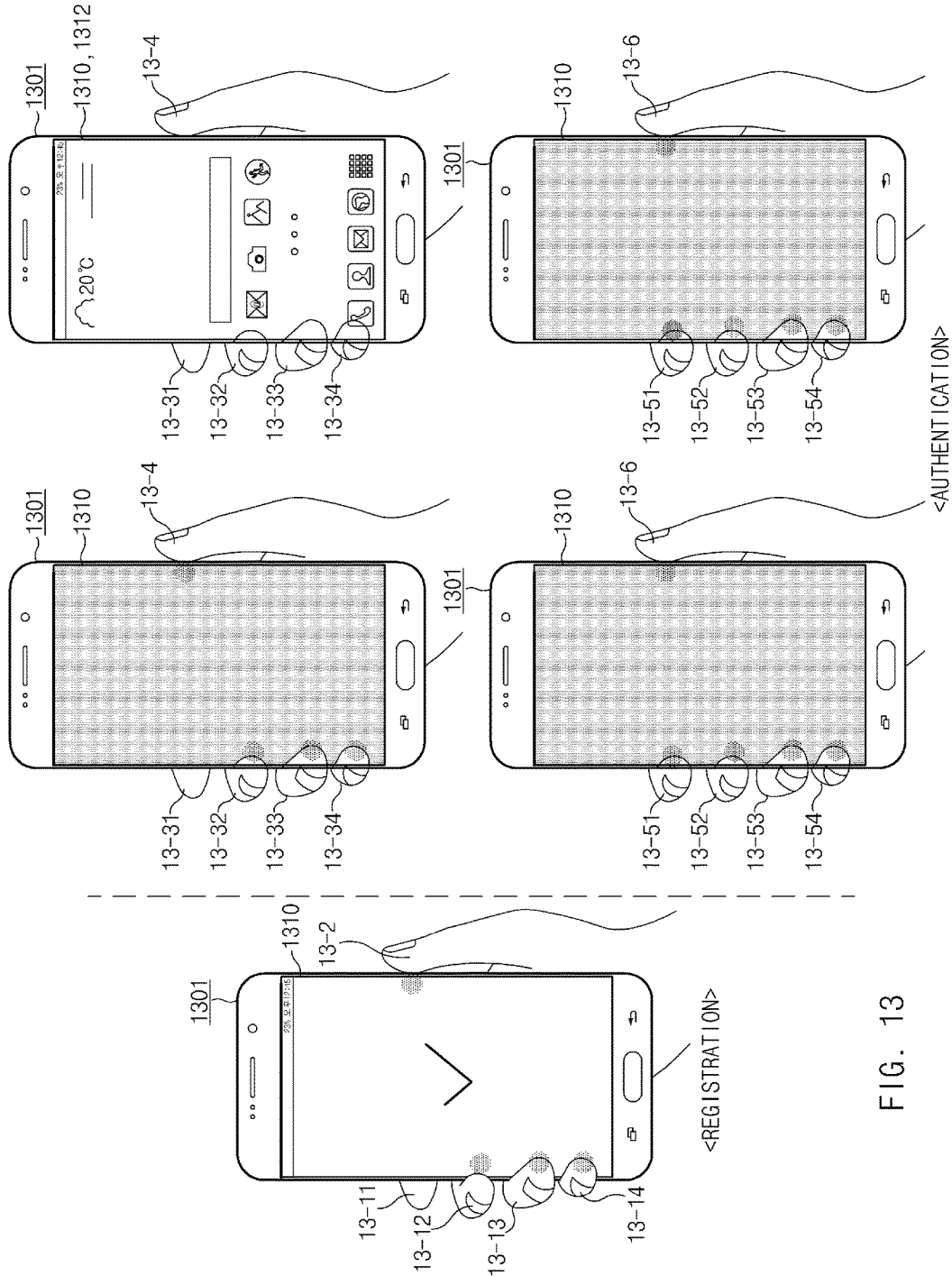
FIG. 13 is a diagram illustrating an example electronic device in which the screen outputting method to which user authentication according to an example embodiment is applied is implemented.

FIG. 13 is a diagram illustrating an example electronic device in which a screen outputting method to which user authentication according to an example embodiment is applied is implemented.

An electronic device 1301 in which a screen outputting method to which user authentication according to an embodiment is applied is implemented is illustrated in FIG. 13. For example, the electronic device 1301 may correspond to the electronic device 601 of FIG. 6. In the description of the electronic device 1301, content to which the descriptions of the electronic device 801 of FIG. 8, the electronic device 901 of FIG. 9, and the electronic device 1101 of FIG. 11 are applied may not be repeated here.

According to an embodiment, the electronic device 1301 may register a touch location and/or pressure of a legal user based on a location and/or pressure of each of a first touch and a second touch in a registration step.

For example, the user may grip the electronic device 1301 by using his/her right hand. For example, when the electronic device 1301 is gripped, a thumb 13-2 of the user may make contact with a right side of the display 1310, and three fingers 13-12, 13-13, and 13-14 may make contact with a left side of the display 1310. A first touch may be implemented when the three fingers 13-12, 13-13, and 13-14 make contact with the left side of the display 1310. Also, a second touch may be implemented when the thumb 13-2 makes contact with the right side of the display 1310.

In the registration step, the electronic device 1301 may detect a location and/or pressure of each of the first touch implemented by the three fingers 13-12, 13-13, and 13-14 and the second touch implemented by the thumb 13-2 and may register and store the detected locations and/or pressure as a grip pattern of a legal user.

According to an embodiment, in an authentication step, the electronic device 1301 may authenticate the user based on the first touch and the second touch. For example, the electronic device 1301 may authenticate the user by using a location, at which the first touch of the user is made, and/or a pressure value of the first touch and a location, at which the second touch of the user is made, and/or a pressure value of the second touch. For example, the electronic device 1301 may authenticate the user by determining whether the location coordinates and/or pressure values of the first touch and the second touch are matched to location coordinates and/or pressure values of the first touch and the second touch stored (or registered) in a memory of the electronic device 1301.

For example, a user "A" may grip the electronic device 1301 by using his/her right hand. For example, when the electronic device 1301 is gripped by the user "A", a thumb 13-4 of the user "A" may make contact with a right side of the display 1310, and three fingers 13-32, 13-33, and 13-34 may make contact with a left side of the display 1310.

If the electronic device 1301 is gripped by the user "A", the electronic device 1301 may detect locations and/or pressure of the touches made by the thumb 13-4 and the three fingers 13-32, 13-33, and 13-34. Afterwards, the electronic device 1301 may determine the locations and/or pressure of the detected touches is matched to a touch pattern (e.g., locations and/or pressure of the touches made by the thumb 13-4 and the three fingers 13-32, 13-33, and 13-34) of a legal user, which is stored (or registered) in the memory.

Since the locations and/or pressure of the touches made by the thumb 13-4 and the three fingers 13-32, 13-33, and 13-34 is matched to the touch pattern of the legal user, which is registered in advance, the electronic device 1301 may authenticate the user "A" as a legal user.

If the user "A" is authenticated, the electronic device 1301 may display a first region and a second region on the display 1310 and may display an unlocked home screen 1312 (an example of a specified screen) on the display 1310 (refer to FIGS. 8, 9, and 11).

For another example, a user "B" may grip the electronic device 1301 by using his/her right hand. For example, when the electronic device 1301 is gripped by the user "B", a thumb 13-6 of the user "B" may make contact with a right side of the display 1310, and the remaining four fingers 13-51, 13-52, 13-53, and 13-54 may make contact with a left side of the display 1310.

If the electronic device 1301 is gripped by the user "B", the electronic device 1301 may detect locations and/or pressure of the touches made by the thumb 13-6 and the four fingers 13-51, 13-52, 13-53, and 13-54. Afterwards, the electronic device 1301 may determine the locations and/or pressure of the detected touches is matched to a touch pattern (e.g., locations and/or pressure of the touches made by the thumb 13-4 and the three fingers 13-32, 13-33, and 13-34) of a legal user, which is stored (or registered) in the memory.

Since the locations and/or pressure of the touches made by the thumb 13-6 and the four fingers 13-51, 13-52, 13-53, and 13-54 is not matched to the touch pattern of the legal user, which is registered in advance, the electronic device 1301 may determine the user "B" as an illegal user.

Since the authentication of the user "B" fails, the electronic device 1301 may continue to maintain a previous off state of the display 1310, may maintain a previous always-on display, or may continue to output a previous lock screen. In this case, the electronic device 1301 may temporarily display, on the display 1310, a notice for requesting the user to again grip the electronic device 1301, a notice indicating authentication failure, or the like.

Figure 14:
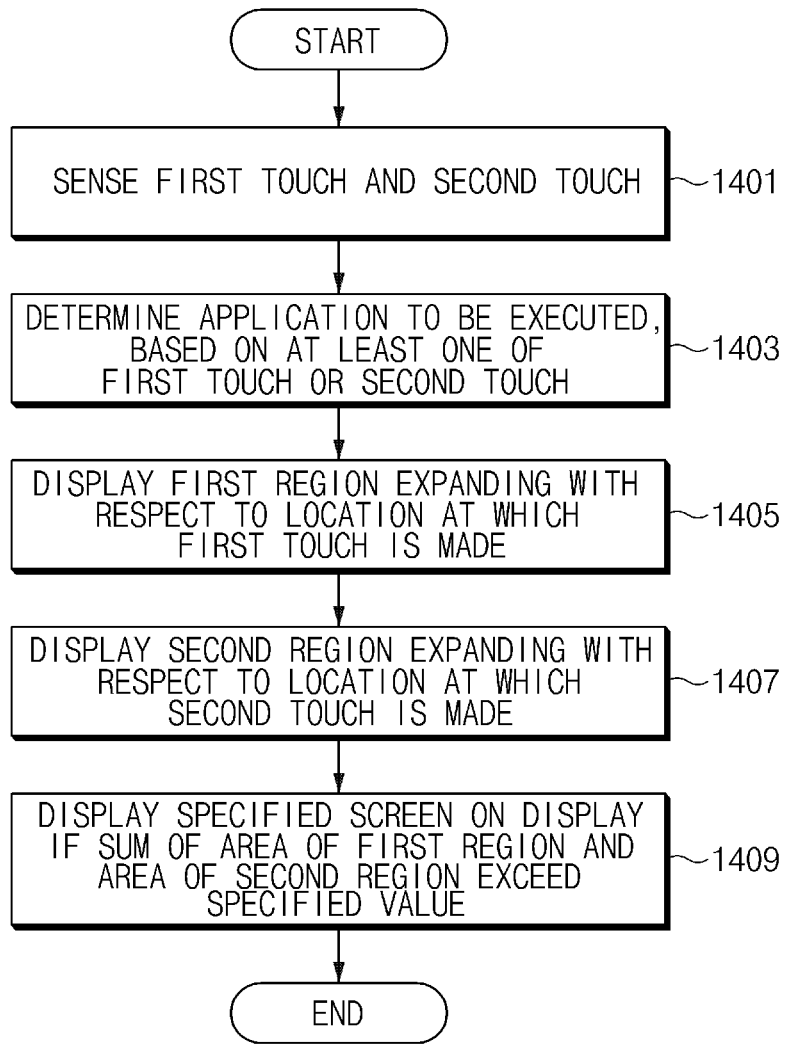
FIG. 14 is a flowchart illustrating an example method for outputting an application execution screen, according to an example embodiment.

FIG. 14 is a flowchart illustrating an example method for outputting an application execution screen, according to an example embodiment.

Referring to FIG. 14, the screen outputting method according to an embodiment may include operation 1401 to operation 1409. Operation 1401 to operation 1409 may be performed by, for example, the electronic device 601 illustrated in FIG. 6. For example, each of operation 1401 to operation 1409 may be implemented with instructions to be performed (or executed) by the processor 650 of the electronic device 601. The instructions may be stored in, for example, the memory 640 of the electronic device 601. Below, reference numerals of FIG. 6 are used to describe the method of FIG. 14, and it is assumed that the display 630 of the electronic device 601 is on. Operations 1405 to 1409 correspond to operations 703 to 707 of FIG. 7, and a detailed description thereof is thus omitted.

In operation 1401, the processor 650 may sense a first touch and a second touch on the touch panel 611. According to an embodiment, the processor 650 may detect location coordinates and/or pressure values of the first touch and the second touch.

In operation 1403, the processor 650 may determine a to-be-executed application based on the first touch and the second touch. For example, the processor 650 may determine the to-be-executed application based on locations at which the first touch and the second touch are made and/or pressure values of the first touch and the second touch. For example, the processor 650 may determine the to-be-executed application by determining whether the location coordinates and/or pressure values of the first touch and the second touch sensed in operation 1401 are matched to location coordinates and/or pressure values of the first touch and the second touch stored (or registered) in the memory 640.

In operation 1405, the processor 650 may display, on the display 630, a first region expanding with respect to a location at which the first touch is made.

In operation 1407, the processor 650 may display, on the display 630, a second region expanding with respect to a location at which the second touch is made.

An order of operation 1405 and operation 1407 is not limited to FIG. 14, and the second region corresponding to the second touch may be displayed prior to the first region or may be displayed at the same time with the first region.

In operation 1409, if a sum of an area of the first region and an area of the second region exceeds a specified value (or ratio) (e.g., 50% of the whole area of the display panel 611), the processor 650 may display a specified screen on the display 630. The specified screen may include an execution screen of the application determined in operation 1403.

For example, the execution screen may include execution screens of extremely diverse applications such as a home application, a camera application, an emergency call application, an image viewer application, an e-book reader application, a health care application, a web browser application, or the like.

Each operation of FIG. 14 is described under the assumption that the display 630 of the electronic device 601 is on. However, according to various embodiments, the display 630 may be off. In the case where the display 630 is off, if it is determined that at least one of a pressure value of the first touch sensed in operation 1401 or a pressure value of the second touch sensed in operation 1401 is larger than a specified value, the processor 650 may activate at least a portion of the display 630 prior to operation 1403 or operation 1405.

Figure 15:
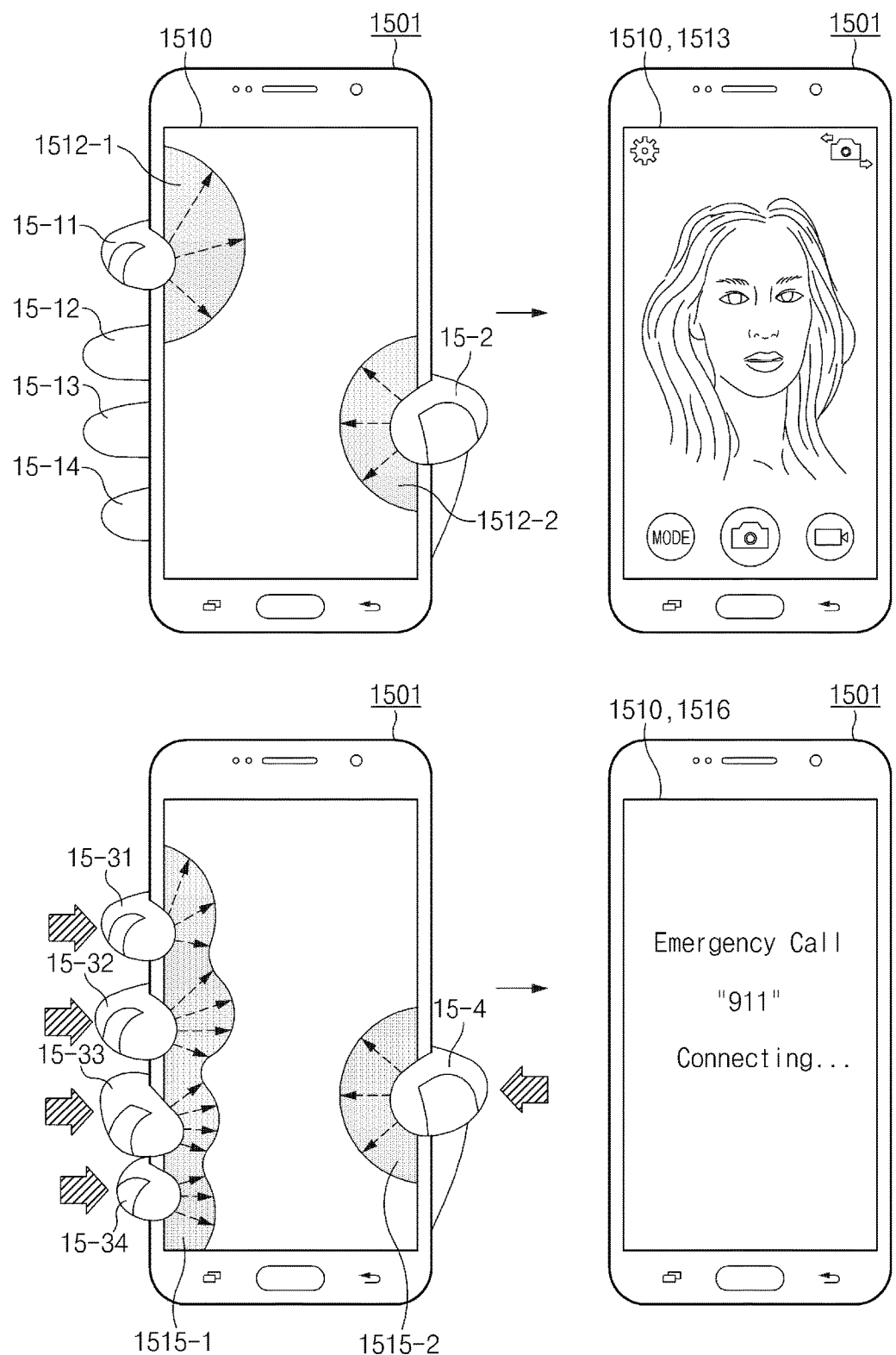
FIG. 15 is a diagram illustrating an example electronic device in which the application execution screen outputting method according to an example embodiment is implemented.

FIG. 15 is a diagram illustrating an example electronic device in which an application execution screen outputting method according to an example embodiment is implemented.

An electronic device 1501 in which an application execution screen outputting method according to an embodiment is implemented is illustrated in FIG. 15. For example, the electronic device 1501 may correspond to the electronic device 601 of FIG. 6. In the description of the electronic device 1501, content to which the descriptions of the electronic device 801 of FIG. 8, the electronic device 901 of FIG. 9, and the electronic device 1101 of FIG. 11 are applied may not be repeated here.

According to an embodiment, at least one application installed in an electronic device 1501 may be set (or registered) to be executed based on a location and/or pressure of at least one touch.

For example, a camera application may be set to be executed if a first touch including a single contact point on an upper-left side of a display 1510 and a second touch including a single contact point on a lower-right side of the display 1510 are received (a first touch pattern). For another example, an emergency call application may be set to be executed if a first force touch of specified pressure or higher, which includes four contact points on a left side of the display 1510, and a second touch of specified pressure or higher, which includes a single contact point on a right side of the display 1510, are received (a second touch pattern).

According to an embodiment, the user may grip the electronic device 1501 by using his/her right hand. For example, when the electronic device 1501 is gripped, a thumb 15-2 of the user may make contact with a right side of the display 1510, and an index finger 15-11 may make contact with a left side of the display 1510 without the remaining fingers 15-12, 15-13 and 15-14 making contact with the left side of the display 1510. If the electronic device 1501 is gripped by the user, the electronic device 1501 may detect locations and/or pressure of the touches made by the thumb 15-2 and the index finger 15-11. Since the locations and/or pressure of the detected touches is matched to the first touch pattern set to the camera application, the electronic device 1501 may display a first region 1512-1 and a second region 1512-2 on the display 1510 and may display an execution screen 1513 (an example of a specified screen) of the camera application on the display 1510 after executing the camera application.

According to another example embodiment, for example, the user may grip the electronic device 1501 by using his/her right hand strongly (with specified pressure or higher). For example, when the electronic device 1501 is gripped by the user, a thumb 15-4 of the user may make a force touch on a right side of the display 1510, and the remaining four fingers 15-31, 15-32, 15-33, and 15-34 may make force touch on a left side of the display 1510. If the electronic device 1501 is strongly gripped by the user, the electronic device 1501 may detect locations and/or pressure of the touches made by the thumb 15-4 and the four fingers 15-31, 15-32, 15-33, and 13-34. Since the locations and/or pressure of the detected touches is matched to the second touch pattern set to the emergency call application, the electronic device 1501 may display a first region 1515-1 and a second region 1515-2 on the display 1510 and may display an execution screen 1516 (an example of a specified screen) of the emergency call application on the display 1510 after executing the emergency call application (refer to FIGS. 8, 9, and 11).

Figure 16:
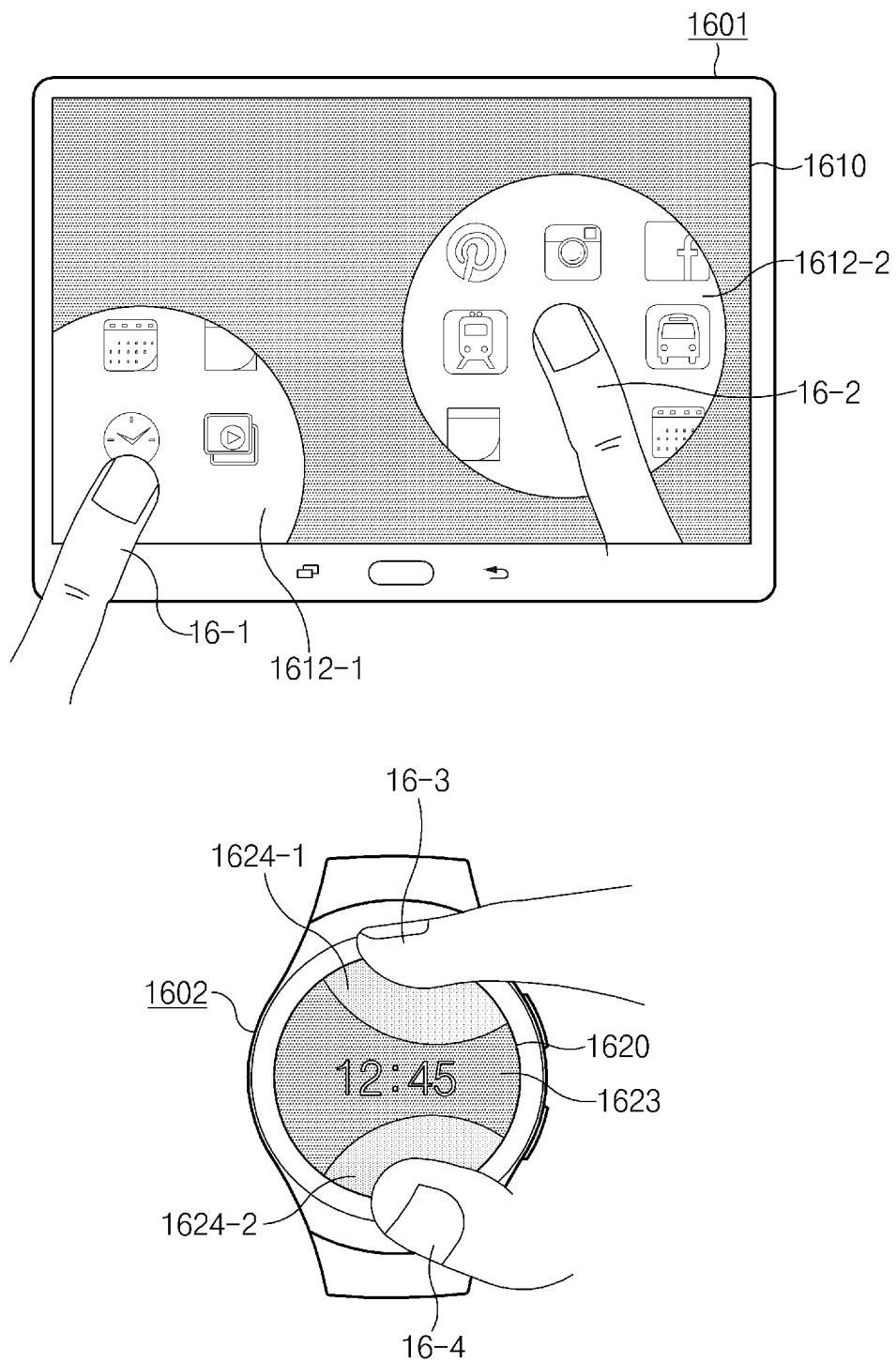
FIG. 16 is a diagram illustrating examples of various types of electronic devices to which various example embodiments of this disclosure are applied.

FIG. 16 is a diagram illustrating examples of various types of electronic devices to which various example embodiments of this disclosure may be applied.

A tablet PC 1601 and a smart watch 1602 to which various embodiments of this disclosure are applied are illustrated in FIG. 16. For example, each of the tablet PC 1601 and the smart watch 1602 may include elements of the electronic device 601 illustrated in FIG. 6.

For example, on a display 1610 (including a touch panel) included in the tablet PC 1601, the user may perform a first touch by using a finger 16-1 and may perform a second touch by using a finger 16-2. The tablet PC 1601 may sense the first touch and the second touch. The tablet PC 1601 may display a first region 1612-1, which is gradually expanding with respect to a location at which the first touch is made, and a second region 1612-2, which is gradually expanding with respect to a location at which the second touch is made, on the display 1610. In this case, an area, in which the first region 1612-1 and the second region 1612-2 are not displayed, of the display 1610 may be deactivated (or off). If a sum of an area of the expanded first region 1612-1 and an area of the expanded second region 1612-2 exceeds a specified value, the tablet PC 1601 may display a specified screen on the display 1610.

As in the above description, on a display 1620 (including a touch panel) included in the smart watch 1602, the user may perform a first touch by using a finger 16-3 and may perform a second touch by using a finger 16-4. The smart watch 1602 may sense the first touch and the second touch. The smart watch 1602 may display a first region 1624-1, which is gradually expanding with respect to a location at which the first touch is made, and a second region 1624-2, which is gradually expanding with respect to a location at which the second touch is made, on the display 1620. In this case, an always-on display including a clock image may be displayed in an area, in which the first region 1624-1 and the second region 1624-2 are not displayed, of the display 1620. If a sum of an area of the expanded first region 1624-1 and an area of the expanded second region 1624-2 exceeds a specified value, the smart watch 1602 may display a specified screen on the display 1620.

The tablet PC 1601 and the smart watch 1602 are exemplified in FIG. 16. However, various embodiments of this disclosure may be applied to various electronic devices including a touch display. Also, various embodiments described with reference to FIGS. 1 to 15 may be applied to the tablet PC 1601 and the smart watch 1602.

According to the various embodiments described above, if a user touch (including a touch, a hovering, and a force touch) is sensed, an electronic device may display a graphic effect corresponding to the touch and may display a specified screen if a specific condition is satisfied.

An electronic device according to an embodiment may include a touch sensitive display, and a processor electrically connected with the touch sensitive display. The processor may sense a first touch and a second touch on the touch sensitive display, may display a first region expanding with respect to a location at which the first touch is made, on the touch sensitive display, may display a second region expanding with respect to a location at which the second touch is made, on the touch sensitive display, and may display a specified screen on the touch sensitive display if a sum of an area of the first region and an area of the second region is not less than a specified value.

According to another embodiment, the first touch or the second touch may include at least one touch.

According to another embodiment, the specified screen may include an unlocked home screen.

According to another embodiment, partial regions of the specified screen, which correspond to the first region and the second region, may be respectively displayed in the first region and the second region.

According to another embodiment, the processor may display the first region and the second region on the touch sensitive display if a sum of a pressure value of the first touch and a pressure value of the second touch is not less than the specified value.

According to another embodiment, the electronic device may further include a pressure sensor that detects a pressure value of a touch on the touch sensitive display. A property of color (e.g., hue, saturation, or value) determined from a pressure value of the first touch may be applied to the first region, and a property of color (e.g., hue, saturation, or value) determined from a pressure value of the second touch may be applied to the second region.

According to another embodiment, if the sum of the area of the first region and the area of the second region is not less than the specified value and the first region and the second region cross each other, the processor may be configured to display the specified screen on the touch sensitive display.

According to another embodiment, the electronic device may further include a pressure sensor that detects a pressure value of a touch on the touch sensitive display. The processor may activate at least a portion of the touch sensitive display if a pressure value of at least one of the first touch or the second touch is larger than a specified value.

According to another embodiment, a speed at which the first region is expanded may be determined according to a contact area of the first touch, and a speed at which the second region is expanded may be determined according to a contact area of the second touch.

According to another embodiment, the electronic device may further include a pressure sensor that detects a pressure value of a touch on the touch sensitive display. A speed at which the first region is expanded may be determined according to a pressure value of the first touch, and a speed at which the second region is expanded may be determined according to a pressure value of the second touch.

According to another embodiment, the processor may authenticate a user based on a location at which the first touch is made and a location at which the second touch is made and may display the first region and the second region on the touch sensitive display if the user is authenticated.

According to another embodiment, the processor may determine an application to be executed, based on at least one of a location at which the first touch is made and a location at which the second touch is made. The specified screen may correspond to an execution screen of the application.

According to another embodiment, the electronic device may further include a pressure sensor that detects a pressure value of a touch on the touch sensitive display. The processor may determine an application to be executed, based on at least one of pressure of the first touch or pressure of the second touch. The specified screen may correspond to an execution screen of the application.

A screen outputting method of an electronic device according to an embodiment may include sensing a first touch and a second touch on a touch sensitive display, displaying a first region expanding with respect to a location at which the first touch is made, on the touch sensitive display, displaying a second region expanding with respect to a location at which the second touch is made, on the touch sensitive display, and displaying a specified screen on the touch sensitive display if a sum of an area of the first region and an area of the second region is not less than a specified value.

According to another embodiment, the method may further include displaying the first region and the second region on the touch sensitive display if a sum of the pressure value of the first touch and the pressure value of the second touch is not less than a specified value.

According to another embodiment, the displaying of the first region may include applying a property of color (e.g., hue, saturation, or value) determined from a pressure value of the first touch, to the first region, and the displaying of the second region may include applying a property of color (e.g., hue, saturation, or value) determined from a pressure value of the second touch, to the second region.

According to another embodiment, the displaying of the specified screen may include displaying the specified screen on the touch sensitive display if the sum of the area of the first region and the area of the second region is not less than the specified value and the first region and the second region cross each other.

According to another embodiment, the method may further include activating at least a portion of the touch sensitive display if at least one of a pressure value of the first touch or a pressure value of the second touch is larger than a specified value.

According to another embodiment, a speed at which the first region is expanded may be determined according to a contact area of the first touch or a pressure value of the first touch, and a speed at which the second region is expanded may be determined according to a contact area of the second touch or a pressure value of the second touch.

According to another embodiment, the method may further include authenticating a user based on a location at which the first touch is made and a location at which the second touch is made. If the user is authenticated, the displaying of the first region and the displaying of the second region may be performed.

According to another embodiment, the method may further include determining an application to be executed, based on at least one of a location at which the first touch is made or a location at which the second touch is made. The displaying of the specified screen may include displaying an execution screen of the application.

According to another embodiment, the method may further include determining an application to be executed, based on at least one of a pressure value of the first touch or a pressure value of the second touch. The displaying of the specified screen may include displaying an execution screen of the application.

The term "module" used in this disclosure may refer, for example, a unit including one or more combinations of hardware, software and firmware or any combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include, for example, and without limitation, at least one of a dedicated processor, a CPU, an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 120), may cause the one or more processors and/or electronic devices to perform a function corresponding to the instruction. The computer-readable storage media, for example, may be the memory 130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

According to embodiments of this disclosure, if a user touch is sensed, an electronic device may display a graphic effect corresponding to the touch in a touch sensitive display; if a specific condition is satisfied, the electronic device may display a specified screen, for example, an unlock screen. Besides, a variety of effects directly or indirectly understood through this disclosure may be provided.

While this disclosure has been illustrated and described with reference to various example embodiments thereof, it will be understood by those skilled in the art that various changes in form and details may be made therein without departing from the spirit and scope of this disclosure as defined by the appended claims and their equivalents.

What is claimed is:

1. An electronic device comprising:
a touch sensitive display; and
a processor electronically connected with the touch sensitive display,
wherein the processor is configured to:
sense a first touch and a second touch on the touch sensitive display;
display a first region expanding with respect to a location at which the first touch is made, on the touch sensitive display;
display a second region expanding with respect to a location at which the second touch is made, on the touch sensitive display; and
display a specified screen on the touch sensitive display if a sum of an area of the first region and an area of the second region exceeds a specified value,
wherein the specified screen comprises at least one of: an unlocked home screen, a specific application screen, a weather screen, a schedule screen, and/or a calendar screen.

2. The electronic device of claim 1, wherein at least one of the first touch or the second touch includes at least one touch.

3. The electronic device of claim 1, wherein the specified screen includes an unlocked home screen.

4. The electronic device of claim 1, wherein partial regions of the specified screen corresponding to the first region and the second region are respectively displayed inside of the first region and the second region.

5. The electronic device of claim 1, further comprising:
a pressure sensor configured to detect a pressure and to generate a corresponding pressure value of a touch on the touch sensitive display,
wherein the processor is configured to:
display the first region and the second region on the touch sensitive display if a sum of a pressure value of the first touch and a pressure value of the second touch exceeds a specified value.

6. The electronic device of claim 1, further comprising:
a pressure sensor configured to detect a pressure and to generate a corresponding pressure value of a touch on the touch sensitive display,
wherein a property of color is determined based on a pressure value of the first touch and is applied to the first region, and
wherein a property of color is determined based on a pressure value of the second touch and is applied to the second region.

7. The electronic device of claim 1, wherein the processor is configured to:
display the specified screen on the touch sensitive display if the sum of the area of the first region and the area of the second region exceeds the specified value, and the first region and the second region intersect each other.

8. The electronic device of claim 1, further comprising:
a pressure sensor configured to detect a pressure and to generate a corresponding pressure value of a touch on the touch sensitive display,
wherein the processor is configured to activate at least a portion of the touch sensitive display if a pressure value of at least one of the first touch and the second touch is larger than a specified value.

9. The electronic device of claim 1, wherein an expanding speed of the first region is determined based on a contact area of the first touch, and
wherein an expanding speed of the second region is determined based on a contact area of the second touch.

10. The electronic device of claim 1, further comprising:
a pressure sensor configured to detect a pressure and to generate a corresponding pressure value of a touch on the touch sensitive display,
wherein an expanding speed of the first region is determined based on a pressure value of the first touch, and
wherein an expanding speed of the second region is determined based on a pressure value of the second touch.

11. The electronic device of claim 1, wherein the processor is configured to authenticate a user based on a location at which the first touch is made and a location at which the second touch is made, and
wherein the processor is configured to display the first region and the second region on the touch sensitive display if the user is authenticated.

12. The electronic device of claim 1, wherein the processor is configured to determine an application to be executed, based on at least one of a location at which the first touch is made and a location at which the second touch is made, and
wherein the specified screen corresponds to an execution screen of the determined application.

13. The electronic device of claim 1, further comprising:
a pressure sensor configured to detect a pressure and to generate a corresponding pressure value of a touch on the touch sensitive display, wherein the processor is configured to determine an application to be executed, based on at least one of the pressure value of the first touch or the pressure value of the second touch, and wherein the specified screen corresponds to an execution screen of the determined application.

14. A screen outputting method of an electronic device, the method comprising:

sensing a first touch and a second touch on a touch sensitive display;

displaying a first region expanding with respect to a location at which the first touch is made, on the touch sensitive display;

displaying a second region expanding with respect to a location at which the second touch is made, on the touch sensitive display; and displaying a specified screen on the touch sensitive display if a sum of an area of the first region and an area of the second region exceeds a specified value, wherein the specified screen comprises at least one of: an unlocked home screen, a specific application screen, a weather screen, a schedule screen, and/or a calendar screen.

15. The method of claim 14, wherein the displaying of the first region includes:

applying a property of color determined based on a pressure value of the first touch, to the first region, and wherein the displaying of the second region includes:

applying a property of color determined based on a pressure value of the second touch, to the second region.

16. The method of claim 14, wherein the displaying of the specified screen includes:

displaying the specified screen on the touch sensitive display if the sum of the area of the first region and the area of the second region exceeds the specified value and the first region and the second region intersect each other.

17. The method of claim 14, further comprising:

activating at least a portion of the touch sensitive display if at least one of a pressure value of the first touch or a pressure value of the second touch is larger than a specified value.

18. The method of claim 14, wherein an expanding speed of the first region is determined based on a contact area of the first touch or a pressure value of the first touch, and wherein an expanding speed of the second region is determined based on a contact area of the second touch or a pressure value of the second touch.

19. The method of claim 14, further comprising:

authenticating a user based on a location at which the first touch is made and a location at which the second touch is made, wherein the displaying of the first region and the displaying of the second region are performed upon the authentication.

20. The method of claim 14, further comprising:

determining an application to be executed, based on at least one of a location at which the first touch is made or a location at which the second touch is made, wherein the specified screen corresponds to an execution screen of the determined application.

* * * * *